US011140697B2

(12) United States Patent
Hu et al.

(10) Patent No.: US 11,140,697 B2
(45) Date of Patent: Oct. 5, 2021

(54) TECHNIQUE FOR SIDELINK FEEDBACK TRANSMISSIONS

(71) Applicant: Telefonaktiebolaget LM Ericsson (publ), Stockholm (SE)

(72) Inventors: Liang Hu, Stockholm (SE); Shehzad Ali Ashraf, Aachen (DE); Marco Belleschi, Solna (SE); Ricardo Blasco Serrano, Espoo (FI); Li Jingya, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 403 days.

(21) Appl. No.: 16/082,451

(22) PCT Filed: Apr. 11, 2018

(86) PCT No.: PCT/EP2018/059296
§ 371 (c)(1),
(2) Date: Sep. 5, 2018

(87) PCT Pub. No.: WO2019/197025
PCT Pub. Date: Oct. 17, 2019

(65) Prior Publication Data
US 2020/0305176 A1    Sep. 24, 2020

(51) Int. Cl.
*H04W 72/12* (2009.01)
*H04B 7/0456* (2017.01)
(Continued)

(52) U.S. Cl.
CPC ...... *H04W 72/1263* (2013.01); *H04B 7/0456* (2013.01); *H04B 7/0626* (2013.01);
(Continued)

(58) Field of Classification Search
CPC . H04W 72/1263; H04W 16/14; H04W 92/18; H04W 72/0446; H04W 72/04;
(Continued)

(56) References Cited

U.S. PATENT DOCUMENTS

| 8,737,299 | B2 | 5/2014 | Liao |
| 9,504,041 | B2 | 11/2016 | Lim et al. |
| 9,532,340 | B2 | 12/2016 | Lu |
| 2002/0052215 | A1* | 5/2002 | Conti ............... H04W 52/52 455/522 |

(Continued)

OTHER PUBLICATIONS

3GPP, 3rd Generation Partnership Project; Technical Specification Group Radio Access Network; Study on further enhancements to LTE Device to Device (D2D), User Equipment (UE) to network relays for Internet of Things (IoT) and wearables; (Release 15); TR 36.746 V15.1.0 (Dec. 2017).

(Continued)

*Primary Examiner* — Ayaz R Sheikh
*Assistant Examiner* — Louis Samara
(74) *Attorney, Agent, or Firm* — Coats & Bennett, PLLC

(57) ABSTRACT

A technique for transmitting and receiving data (602) using a sidelink, SL, radio communication (604) between a first radio device (100) and a second radio device (200) is described. As to one method aspect of the technique, a scheduling assignment, SA (601), announcing a transmission of the data (602) for the second radio device (200) is broadcasted. The data is transmitted according to the SA (601) from the first radio device (100) in a unicast mode to the second radio device (200). Responsive to the data transmission, a control feedback (608) is received from the second radio device (200) in a unicast mode at the first radio device (100), wherein the control feedback (608) is received on a feedback radio resource (708) determined by at least one of the first radio device (100) and the second radio device (200).

20 Claims, 14 Drawing Sheets

300

(51) Int. Cl.
*H04B 7/06* (2006.01)
*H04L 1/00* (2006.01)
*H04L 1/18* (2006.01)
*H04W 16/14* (2009.01)
*H04W 92/18* (2009.01)

(52) U.S. Cl.
CPC .......... *H04L 1/0003* (2013.01); *H04L 1/1819* (2013.01); *H04W 16/14* (2013.01); *H04W 92/18* (2013.01)

(58) Field of Classification Search
CPC . H04W 72/08; H04W 72/0406; H04W 52/52; H04W 4/06; H04W 4/70; H04B 7/0456; H04B 7/0626; H04L 1/0003; H04L 1/1819; H04L 1/1812; H04L 5/0094; H04L 67/12
See application file for complete search history.

(56) References Cited

U.S. PATENT DOCUMENTS

| | | | |
|---|---|---|---|
| 2017/0215183 A1* | 7/2017 | Gulati | H04L 1/1812 |
| 2018/0146478 A1* | 5/2018 | Kim | H04W 4/06 |
| 2018/0176892 A1* | 6/2018 | Kim | H04W 72/0406 |
| 2018/0206252 A1* | 7/2018 | Thangarasa | H04W 72/08 |
| 2019/0215817 A1* | 7/2019 | Chae | H04W 4/70 |
| 2020/0236666 A1* | 7/2020 | Yu | H04W 72/0446 |
| 2020/0296557 A1* | 9/2020 | Lee | H04W 72/0406 |
| 2020/0296722 A1* | 9/2020 | Sambale | H04L 67/12 |
| 2020/0322924 A1* | 10/2020 | Kim | H04L 1/0003 |

OTHER PUBLICATIONS

Ericsson, Physical layer structure for SL NR V2X, 3GPP TSG-RAN WG1 Meeting #95, Spokane, WA, US, Nov. 12-16, 2018, R1-1813638.
Ericsson, On the Support of HARQ/CSI feedbacks Over Sidelink, 3GPP TSG-RAN WG2 #104, TDoc R2-1817957.

* cited by examiner

100

200

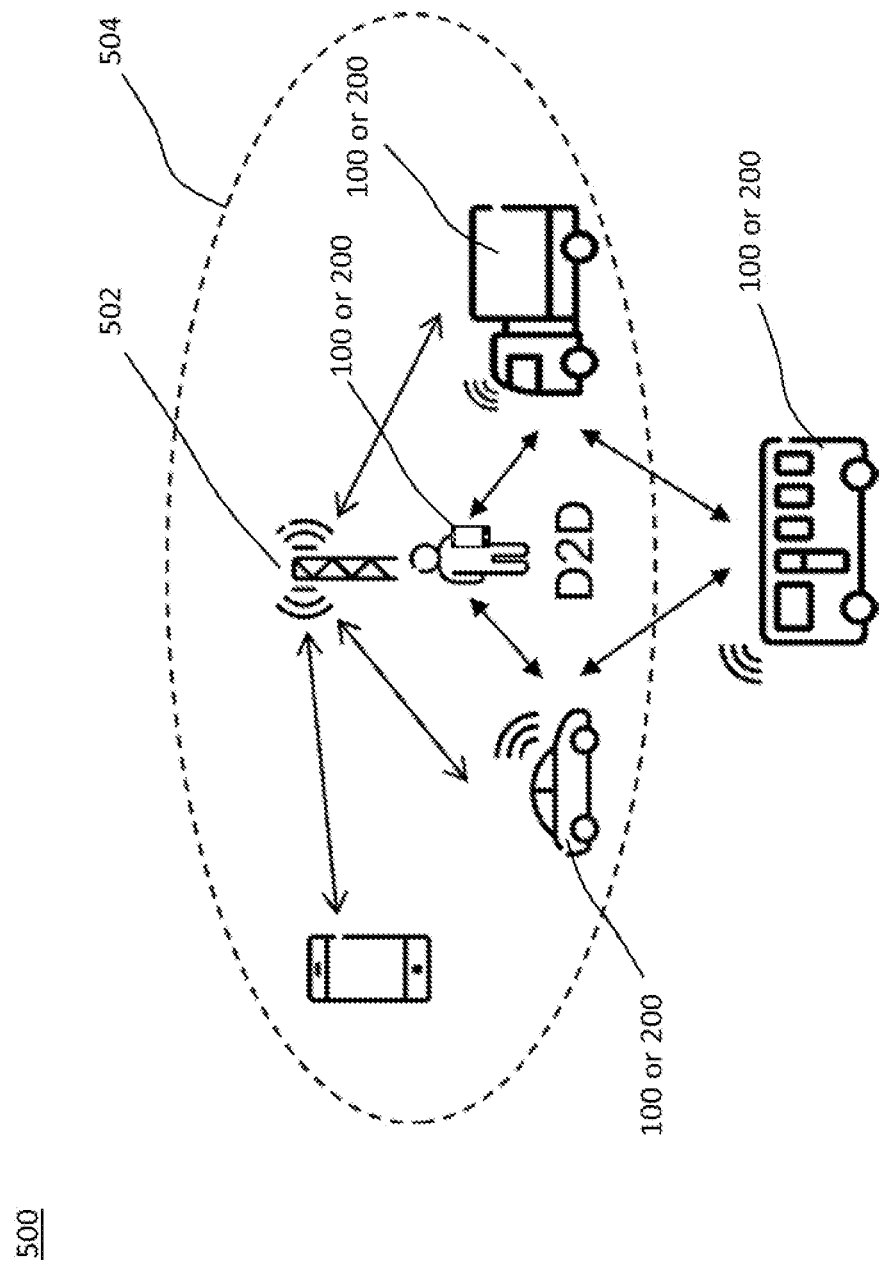

TECHNIQUE FOR SIDELINK FEEDBACK TRANSMISSIONS

TECHNICAL FIELD

The present disclosure relates to a technique for transmitting and receiving data using a sidelink radio communication. More specifically, and without limitation, methods and devices are provided for allocating radio resources in a unicast sidelink communication with feedback transmissions.

BACKGROUND

Radio communication for road traffic can actively decrease road fatalities, improve is road capacity, diminish the carbon footprint of road transport and enhance the user experience during travels. To this end, vehicle-to-vehicle (V2V), vehicle-to-pedestrian (V2P) and vehicle-to-infrastructure (V2I) communication, collectively referred as vehicle-to-anything (V2X) communication, requires high reliability and low end-to-end (E2E) latency, which is achievable by device-to-device (D2D) communication, i.e., direct communication including packet transmission directly among radio devices participating in the traffic.

The European Telecommunications Standards Institute (ETSI) has defined a middleware solution to support vehicular safety and traffic efficiency services needing continuous status information about surrounding vehicles or wanting to send asynchronous warning notifications to vehicles. The former capability is offered by the Cooperative Awareness Message (CAM), while the latter is provided by the Decentralized Environmental Notification Message (DENM). The messages are broadcasted and are to be detected by all vehicles in proximity. However, stricter requirements as to reliability and latency may be needed for pre-crash sensing warning as well as further enhanced V2X services.

To enhance system level performance, e.g., under high density, while meeting the latency requirements of V2X communication, the Third Generation Partnership Project (3GPP) introduced sidelink (SL) transmission modes 3 and 4 (also referred to as resource allocation modes) for V2X communication with and without the infrastructure of a radio access network (RAN) being involved, respectively. The RAN is in charge of allocating radio resources to a transmitting radio device (i.e., centralized scheduling) in mode 3, whereas the transmitting radio device autonomously selects the radio resources for its own transmissions (i.e., distributed scheduling) in mode 4.

The existing SL radio communications defined by 3GPP Releases 14 and 15 for Long Term Evolution (LTE) only comprise broadcast communications. As consequence, data has to be blindly retransmitted without feedback, e.g., according to the clause 14.1.1.7 in the document 36.213, version 15.0.0, which works well for conventional V2X use cases based on basic CAM and DENM. However, in such use cases the latency and reliability requirements are not as high as in future V2X uses cases.

Other existing techniques allow for resource allocation for sidelink feedback transmissions but rely on a RAN node to allocate a feedback channel resource. For example, the document U.S. Pat. No. 9,532,340 B2 describes that a RAN node allocates the feedback channel resource to two sidelink communication devices in a time-division duplex (TDD) cellular network. The document U.S. Pat. No. 9,504,041 B2 describes that a RAN node allocates the feedback channel resource for a cluster of sidelink cooperative communication devices. Furthermore, the document U.S. Pat. No. 8,737,299 B2 describes a resource allocation of an uplink HARQ feedback channel for carrier aggregation in orthogonal frequency-division multiple access (OFDMA) systems. However, such existing techniques require additional signaling with the RAN, which can contravene the latency requirements. Furthermore, reliability may require that the radio communication is not limited to areas covered by RAN infrastructure.

SUMMARY

Accordingly, there is a need for a SL radio communication technique that meets the requirements of future V2X use cases. Alternatively or in addition, there is a need for a SL radio communication technique that enables at least one of unicast and feedback-based radio communication features, particularly in coexistence with broadcast transmissions.

As to a first method aspect, a method of transmitting data using a sidelink (SL) radio communication between a first radio device and a second radio device is provided. The method may comprise or initiate a step of broadcasting a scheduling assignment (SA). The SA may announce a transmission of the data for the second radio device. The method may further comprise or initiate a step of transmitting the data according to the SA from the first radio device in a unicast mode to the second radio device. The method may further comprise or initiate a step of receiving, responsive to the data transmission, a control feedback from the second radio device in a unicast mode at the first radio device. The control feedback may be received on a feedback radio resource determined by at least one of the first radio device and the second radio device.

At least in some embodiments, determining the feedback radio resource at the first radio device and/or the second radio device can enable the control feedback for a feedback-controlled transmission, e.g., independent of a cellular radio access network (RAN) and/or without a centralized scheduler (e.g., a base station) allocating (e.g., assigning or granting) the feedback radio resource.

In same or further embodiments, determining the feedback radio resource of the control feedback at the first radio device and/or the second radio device can increase spectral efficiency of the SL radio communication (e.g., by reducing or avoiding multiple reservations or unused preemptive allocations of radio resources for the control feedback), can reduce latency of the data transmission (e.g., reduce the time until successful data reception by indicating a negative acknowledgment or avoid transmission error by adapting modulation and/or coding of the data), can reduce signaling overhead (e.g., by avoiding additional signaling with the RAN) and/or can increase reliability of the data transmission (e.g., by indicating a negative acknowledgment and/or by adapting modulation and/or coding of the data).

By transmitting both the data and the control feedback using the SL radio communication in the unicast mode, requirements as to latency and/or reliability (e.g., for future V2X use cases) may be fulfilled. Embodiments may enable advanced radio communication features based on the control feedback. For example, the control feedback may control a hybrid automatic repeat request (HARQ) process, optionally with chase combing and/or an incremental redundancy. In same of further embodiments, the control feedback may control any radio communication features that cannot be supported in existing broadcast SL radio communications.

The technique may be implemented by methods and/or corresponding signaling for resource allocation in unicast SL radio communication with feedback transmissions. In particular, the technique may encompass sidelink feedback mechanisms implemented by a set of signaling methods and radio device behaviors of indicating and/or selecting the feedback radio resource for transmitting feedback information in the unicast SL radio communications. Since the feedback radio resource is determined by at least one of the first radio device and the second radio device, the technique may be implemented to avoid radio resource collisions with other sidelink data transmissions and/or other control transmissions when sending the control feedback, so as to improve transmission reliability (e.g., in terms of a packet delivery ratio). For example, the radio device behavior may avoid radio resource collisions with other SL data transmissions and SL control signaling transmissions.

Embodiments of the technique enable a feedback mechanism for the SL radio communication. Same or further embodiments enable determining, allocating or selecting the feedback radio resource, e.g., in terms of timing and/or frequency for the transmission of the control feedback.

The control feedback may support an efficient unicast retransmission in the SL radio communication. For example, determining the feedback radio resource at the first or second radio device may enable unicast transmissions and/or retransmission of the data that co-exist with broadcast transmissions in the same pool of radio resources or shared radio spectrum. For example, the determined feedback radio resource may be determined not among radio resources dedicated for the SL radio communication. Preferably, the pool of radio resource does not consist of radio resources exclusively for either unicast or broadcast communications.

The control feedback may comprise any feedback information. For example, the control feedback may comprise a HARQ-ACK and/or a CSI report.

The SL radio communication may also be referred to as a device-to-device (D2D) communication or a proximity service (ProSe), e.g., according to the Third Generation Partnership Project (3GPP), particularly the document 3GPP TS 23.303, Version 15.0.0. The SL radio communication may comprise a vehicular communication or Vehicle-to-Everything (V2X) communication, e.g., according to the documents 3GPP TR 36.786, Version 14.0.0 and/or 3GPP TS 23.285, Version 15.0.0.

Any one of the first and second radio devices may be a UE or a node other than a base station, e.g., according to the standard family of 3GPP. Alternatively or in addition, any one of the first and second radio devices may be a mobile or portable station or a station other than an access point, e.g., according to the standard family of IEEE 802.11 (also: Wi-Fi), particularly Wi-Fi Direct or Wi-Fi Peer-to-Peer.

The first radio device may perform the first method aspect.

The technique may be implemented for any D2D or direct communication between two radio devices. A radio network may comprise the first and second radio devices. The radio network may be a vehicular network, an ad hoc network and/or a mesh network. The radio network may comprise a plurality of radio devices including at least one embodiment of the first radio device and at least one embodiment of the second radio device.

The unicast mode for the transmission of the data may be implemented by a unique association (also: relation), e.g., in terms of time and/or frequency, between the broadcasting of the SA and the transmission of the data. The unique association for the data transmission may be predefined (e.g., hard-coded) by a technical standard and/or configured (e.g., by the radio network) at the first radio device and/or the second radio device.

The unicast mode for the reception of the control feedback may be implemented by a unique association, e.g., in terms of time and/or frequency, between the feedback radio resource and at least one of the broadcasting of the SA and the transmission of the data. The unique association for the control feedback may be predefined (e.g., hard-coded) by a technical standard, configured (e.g., by the radio network) at the first radio device and/or the second radio device or determined by the first radio device and/or the second radio device for the determining of the feedback radio resource.

The feedback radio resource carrying the control feedback may be uniquely associated with at least one of the broadcasting of the SA for the data, the transmission of the data, the first radio device and the second radio device.

In same or further embodiments, determining the feedback radio resource at the first and/or second radio device can enable the unicast mode for the control feedback, e.g., by uniquely associating the determined feedback radio resource with the first radio device, the second radio device or the pair of first radio device and second radio device. In other words, determining the feedback radio resource at the first and/or second radio device can enable unicast addressing for the control feedback and/or a one-to-one association between the second radio device as a source (or sender) and the first radio device as a target (or destination) of the control feedback. Alternatively or in addition, the control feedback may be uniquely associated with the underlying data transmission.

The association may be unique among a plurality of other SA broadcastings or data transmissions occurring in the radio network or among a plurality of other radio devices belonging to the radio network.

The transmission of the data and/or the reception of the control feedback may be in the unicast mode by referring to an identifier (ID) of at least one of the first radio device and the second radio device. The ID of the respective radio device may also be referred to as radio device ID, e.g. UE ID or ProSe UE ID.

For example, the SA may announce the transmission of "the data for the second radio device" by including the radio device ID of the first and/or second radio device (or an ID derived from the respective radio device ID) in the SA. The transmission of the data and/or the reception of the control feedback may be "in the unicast mode" by being associated with the SA. The SL radio communication in the unicast mode may be briefly referred to as unicast communication.

The radio device ID may be any physical layer identifier (also: PHY ID or L1 ID) or link layer identifier (also: Layer-2 ID or L2 ID, e.g., for Medium Access Control, MAC, or Radio Link Control, RLC) that is used for subsequent direct communication. For example, the radio device ID (e.g., the UE ID) may be provided to the respective radio device (e.g., the respective UE) during provisioning time according to the provisioning options described in clause 6.1.2.1 of the document 3GPP TR 23.713, Version 13.0.0.

For example, the unicast communication may identify the respective radio device as the target or destination using its ProSe UE ID. A MAC layer (e.g., at the respective other radio device as the source or sender) may derive from the ProSe UE ID (e.g., comprising 24 bits) of the respective radio device being the target or destination a shorter SA L1 ID (e.g., comprising 8 bits). The SA L1 ID may be included in the SA.

The control feedback from the second radio device may be indicative of a state at the second radio device for at least one of the SL radio communication and the transmitted data.

The control feedback may control a further data transmission from the first radio device in a unicast mode to the second radio device. The control feedback may trigger the further data transmission. Alternatively or in addition, a transmission radio resource and/or one or more transmission parameters of the further data transmission may be determined based on the control feedback.

The feedback radio resource may be determined in terms of at least one of time, frequency and space. The feedback radio resource may be determined in terms of time by a TTI, a subframe, a slot or one or more symbols. The feedback radio resource may be determined in terms of frequency by a channel, a subchannel, or one or more subcarriers. The feedback radio resource may be determined in terms of space by a beamforming transmission at the second radio device, a beamforming to reception at the first radio device or one or more spatial streams The SL radio communication may use shared radio spectrum. Examples for shared radio spectrum may comprise at least one of unlicensed radio spectrum, radio spectrum used by multiple radio devices not controlled by a common scheduler or RAN and radio spectrum shared by different radio access technologies (RATs). The shared radio spectrum may be a channel or subchannel of a radio spectrum used by the radio network.

The method may further comprise or initiate a step of determining, on the shared radio spectrum, at least one of a broadcast radio resource for the broadcasting of the SA, a transmission radio resource for the transmitting of the data and the feedback radio resource for the receiving of the control feedback.

The first radio device may determine at least one of a broadcast radio resource for broadcasting the SA, a transmission radio resource for transmitting the data and the feedback radio resource. Alternatively or in addition, the second radio device may determine the feedback radio resource.

The determination of at least one of the broadcast radio resource, the transmission radio resource and the feedback radio resource may be based on monitoring the shared radio spectrum for at least one of energy indicative of another transmission on the shared radio spectrum and a SA from another radio device announcing another transmission on the shared radio spectrum.

The determined broadcast radio resource, transmission radio resource and/or feedback radio resource may avoid or minimize a resource collision with the other transmission. Monitoring the shared radio spectrum for energy indicative of another transmission may also be referred to channel sensing. Monitoring the shared radio spectrum for a SA from another radio device announcing another transmission may also be referred to as channel monitoring.

The first radio device may determine time-frequency resources from a set of radio resources as the transmission radio resource. The set of radio resources may be configured by the radio network or preconfigured in the first radio device. Alternatively or in addition, determining the transmission radio resource may comprise receiving, from the radio network, a scheduling grant (e.g., a semi-persistent scheduling) indicative of the transmission radio resource or the configured to set of radio resources.

The determination (also: selection) of any of these radio resources may comprise performing a radio resource allocation procedure. At least one of the first radio device and the second radio device may perform the radio resource allocation procedure.

The transmission radio resource may be allocated in a transmission time interval (TTI). The transmission radio resource may selectively exclude modulation symbols in the TTI for which the SA from the other radio device is indicative of another control feedback transmission.

The SL radio communication may comprise one or more TTIs (e.g., slots or subframes) in the time domain. A first portion of one of the TTIs may be used for the transmission of the data and a second portion of the one TTI may be used for the reception of the control feedback.

The SA may be indicative of the determined feedback radio resource. For example, the SA may be indicative of the presence of the feedback radio resource.

The SA may be indicative of the feedback radio resource in the time domain. For example, the feedback radio resource may be defined in the time domain by a temporal offset or timing relation relative to the broadcasting radio resource carrying the SA and/or the transmission radio resource carrying the data. The SA may be indicative of the temporal offset and/or the temporal offset may be predefined or configured by the radio network. Alternatively or in addition, the feedback radio resource may be defined in the frequency domain by the frequency, channel or subchannel of the broadcasting radio resource carrying the SA and/or the transmission radio resource carrying the data.

The SA may be expressly indicative of at least one of time, frequency and space of the feedback radio resource for the reception of the control feedback. Alternatively or in combination, the feedback radio resource for the reception of the control feedback may be defined by a timing relation relative to the broadcasting radio resource for the broadcasting of the SA or relative to the transmission radio resource for the transmission of the data. The timing relation may be defined in terms of a TTI (e.g., a subframe or a slot).

The timing relation may be predefined at the first radio device and/or configured by the radio network. Alternatively or in addition, the SA may be indicative of the timing relation. The timing relation may depend on at least one of a capability of the second radio device, a service type underlying the data and a priority of the data.

At least two of the SA, the data and the control feedback may be transmitted in separate TTIs. The broadcast radio resource and/or the transmission radio resource may be allocated in a first TTI. The feedback radio resource may be allocated in a second TTI. The second TTI may be after the first TTI. The first and second TTIs may be separated according to the timing relation.

At least two of the SA, the data and the control feedback may be transmitted in the same TTI. The broadcast radio resource and/or the transmission radio resource may be allocated in a TTI that further comprises the feedback radio resource.

Herein, the TTI may encompass a subframe (e.g., an LTE subframe), a slot (e.g., an LTE or NR slot) and/or a SL control period (also: SC Period). For example, the SC Period may be the time period comprising the transmission of the SA (e.g., in sidelink control information, SCI) and its corresponding data.

The SA may be broadcasted on a physical SL control channel (PSCCH) of the radio network and/or broadcasted in SL control information (SCI) of the radio network. The PSCCH may comprise specific PRBs across time on one or more subchannels of the shared spectrum. The PRBs of the PSCCH may be disjoint from PRBs available for the transmission of the data in the SL radio communication.

The SA may be broadcasted and the data may be transmitted in the same TTI. Alternatively or in addition, the transmission of the data announced by or associated with the SA may occupy adjacent PRBs in the same TTI.

Herein, a subchannel may be any frequency resource (i.e., any radio resource in the frequency domain), e.g., within a channel or bandwidth allocated to, used by or usable by a radio device transmitting the data, a radio device receiving the data or other radio devices of the radio network. Alternatively or in addition, a subchannel may encompass a set of subcarriers, e.g., in a physical resource block (PRB) and/or for orthogonal frequency division multiplexing (OFDM).

The control feedback may comprise a positive acknowledgment (ACK) or negative acknowledgment (NACK) indicative of success or failure, respectively, in decoding the transmitted data at the second radio device.

The data may be transmitted using a hybrid automatic repeat request (HARQ) process and the control feedback controls the HARQ process. The control feedback may be indicative of a redundancy version (RV) to be used in a HARQ retransmission of the data from the first radio device to the second radio device. The NACK in the control feedback may trigger the HARQ retransmission of the data from the first radio device to the second radio device.

The SL radio communication may use an adaptive SL HARQ process. The transmission of the data and the retransmission (or each retransmission) of the data may use a different RV. The RV may be determined by the control feedback from the second radio device.

The control feedback may be indicative of channel state information (CSI) for the SL radio communication. The CSI may be requested in the data transmission. The CSI may be based on a radio measurement of the data transmission, e.g., reference symbols comprised in the data transmission.

For example, at least one of a frequency resource (e.g., one or more subchannels), a time resource (e.g., one or more TTIs) and a spatial resource (e.g., one or more spatial streams or transmission beams) of the further data transmission may depend on the control feedback. The one or more transmission parameters may comprise a transmission power and/or precoding weights (e.g., a precoding vector or precoding matrix, e.g., for a beamforming transmission or a MIMO channel). A closed-loop transmission of the data from the first radio device to the second radio device may be based on the control feedback. Alternatively or in addition, further data transmitted in the further data transmission may be determined, encoded or modulated depending on the control feedback.

The SL radio communication may use, depending on the control feedback, at least one of a modulation coding scheme (MCS), a precoding matrix, a transmission rank for a multiple-input multiple-output (MIMO) channel and a transmit power.

As to a second method aspect, a method of receiving data using a SL radio communication between a first radio device and a second radio device is provided. The method may comprise or initiate a step of receiving a SA. The SA may announce a transmission of the data for the second radio device. The method may further comprise or initiate a step of receiving the data according to the SA from the first radio device in a unicast mode at the second radio device. The method may further comprise or initiate a step of transmitting, responsive to the data reception, a control feedback from the second radio device in a unicast mode to the first radio device. The control feedback may be transmitted on a feedback radio resource determined by at least one of the first radio device and the second radio device.

The control feedback may be transmitted using the feedback radio resource. The feedback radio resource may carry the control feedback.

The SL radio communication may use shared radio spectrum. The method may further comprise or initiate a step of determining, on the shared radio spectrum, the feedback radio resource for the transmitting of the control feedback. The determination of the feedback radio resource may be based on monitoring the shared radio spectrum for at least one of energy indicative of another transmission on the shared radio spectrum, the SA from the first radio device and another SA from another radio device announcing another transmission on the shared radio spectrum.

The SA may be indicative of the determined feedback radio resource. For example, the reception of the data may further comprise receiving the SA (e.g., SCI), which is indicative of the feedback radio resource for the control feedback.

The second method aspect may further comprise any feature, or may comprise or initiate any step, disclosed in the context of the first method aspect or a feature or step corresponding thereto. Moreover, the first method aspect may be performed at or by the first radio device. Alternatively or in combination, the second method aspect may be performed at or by the second radio device. The first radio device and second radio device may be spaced apart. The first radio device and second radio device may be in data or signal communication exclusively by means of the SL radio communication.

In any aspect, at least some embodiments can avoid or reduce radio resource collisions for the SL radio communication by means of centralized scheduling at the RAN (e.g., according to SL transmission mode 3 of 3GPP LTE). Alternatively or in addition, in an autonomous transmission mode (i.e., for decentralized scheduling, such as SL transmission mode 4 according to 3GPP LTE), by determining the feedback radio resource at the first and/or second radio device, the transmission of the control feedback over the SL radio communication may avoid or reduce radio resource collisions, e.g. between different radio devices and/or between different physical channels (e.g., for data and signaling, respectively) that are separate only in the time domain.

The SL radio communication between the first and second radio devices may also be referred to as a device-to-device (D2D) communication. The first radio device may also be referred to as a data-transmitting radio device or transmitter. The second radio device may also be referred to as a data-receiving radio device or receiver.

Embodiments enable the second radio device to influence, determine and/or control by means of the control feedback radio resources and/or parameters of a further data transmission from the first radio device to the second radio device.

At least one of the radio devices, e.g., the first and/or the second radio device, may be configured to exchange the data with or forward the data from or to the Internet and/or a host computer. At least one of the radio devices, e.g., the first and/or the second radio device, may function as a gateway to the Internet and/or the host computer. For example, the data may be sent from the host computer through the first radio device to the second radio device. The data from the host computer may comprise media streams (e.g., video or music), network feeds (e.g., sequences of images and texts), search engine results (e.g., a list of universal resource locators), speech recognition services (an audio stream of a synthesized voice from the host computer responsive to a recorded audio stream sent to the host computer), location-specific information (e.g., objects for rendering an augmented reality) and/or program code (e.g., for mobile applications or "apps").

Each of the first radio device and/or the second radio device may comprise an antenna array. The first radio device may use its antenna array for transmitting the data and/or for receiving the control feedback. The second radio device may use its antenna array for receiving the data and/or transmitting the control feedback. The SL radio communication may use a multiple-input multiple-output (MIMO) channel.

The SL radio communication may be a directional radio communication. The directional radio communication may comprise a directional transmission and/or a directional reception. Examples for the directional radio transmission may include at least one of precoding the antenna array (e.g., for a beamforming transmission) at the first radio device, coherently combining the antenna array (e.g., for a beamforming reception) at the second radio device and shadowing (e.g., an obstructed radio propagation) between the transmitting devices.

In any aspect, the first radio device and the second radio device may form, or may be part of, a radio network. The radio network may be a vehicular, ad hoc and/or mesh network, e.g., according to the Third Generation Partnership Project (3GPP) or according to the standard family IEEE 802.11 (Wi-Fi). The first method aspect may be performed by one or more embodiments of the first radio device in the radio network. The second method aspect may be performed by one or more embodiments of the second radio device in the radio network.

Any of the first and second radio devices may be a mobile or wireless radio device, e.g., a 3GPP user equipment (UE) or a Wi-Fi station (STA). The first radio device and/or the second radio device may be mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with a base station, also referred to as transmission and reception point (TRP), radio access node or access point (AP). A radio access network (RAN) may comprise one or more of the base stations. Herein, the base station may encompass any station that is configured to provide radio access to any of the first and second radio devices. Alternatively or in addition, at least one of the radio devices may function as a gateway between the radio network and the RAN and/or the Internet, particularly for a data link to the host computer providing the data. Examples for the base stations may include a 36 base station or Node B, 4G base station or eNodeB, a 5G base station or gNodeB, and a Wi-Fi AP.

The RAN may be implemented according to the Global System for Mobile Communications (GSM), the Universal Mobile Telecommunications System (UMTS), 3GPP Long Term Evolution (LTE) and/or 3GPP New Radio (NR).

Any embodiment of the first and second radio devices may selectively perform the corresponding method aspect in a mode for autonomous resources selection or distributed scheduling, e.g., if the first radio device and/or the second radio device of the radio communication is out of coverage of the RAN.

The radio communication may be a 3GPP D2D sidelink (SL) with distributed scheduling and/or 3GPP SL transmission mode 4. The technique may be compatible with or extend at least one of the document 3GPP TS 24.386, e.g., version 14.3.0; the document 3GPP TS 23.303, e.g., version 14.1.0; the document 3GPP TS 23.285, e.g., version 14.5.0; and the document 3GPP TS 22.185, e.g., version 14.3.0.

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via the radio network, the RAN, the Internet and/or the host computer. Alternatively or in addition, the method may be encoded in a Field-Programmable Gate Array (FPGA) and/or an Application-Specific Integrated Circuit (ASIC), or the functionality may be provided for download by means of a hardware description language.

As to a first device aspect, a first radio device for transmitting data using a SL radio communication between the first radio device and a second radio device is provided. The first radio device may be configured to perform the first method aspect. Alternatively or in addition, the first radio device may comprise a broadcasting unit configured to broadcast a SA announcing a transmission of the data for the second radio device. Alternatively or in addition, the first radio device may comprise a transmitting unit configured to transmit the data according to the SA from the first radio device in a unicast mode to the second radio device. Alternatively or in addition, the first radio device may comprise a receiving unit configured to receive, responsive to the data transmission, a control feedback from the second radio device in a unicast mode at the first radio device, wherein the control feedback is received on a feedback radio resource determined by at least one of the first radio device and the second radio device.

As to a second device aspect, a second radio device for receiving data using a SL radio communication between a first radio device and the second radio device is provided. The second radio device may be configured to perform the second method aspect. Alternatively or in addition, the second radio device may comprise a receiving unit configured to receive a SA announcing a transmission of the data for the second radio device. Alternatively or in addition, the second radio device may comprise a receiving unit configured to receive the data according to the SA from the first radio device in a unicast mode at the second radio device. Alternatively or in addition, the second radio device may comprise a transmitting unit configured to transmit, responsive to the data reception, a control feedback from the second radio device in a unicast mode to the first radio device, wherein the control feedback is transmitted on a feedback radio resource determined by at least one of the first radio device and the second radio device.

As to a further first device aspect, a first radio device for transmitting data using a SL radio communication between the first radio device and a second radio device is provided. The first radio device comprises at least one processor and a memory. Said memory may comprise instructions executable by said at least one processor whereby the first radio device is operative to broadcast a SA announcing a transmission of the data for the second radio device. Execution of the instructions may further cause the first radio device to be operative to transmit the data according to the SA from the first radio device in a unicast mode to the second radio device. Execution of the instructions may further cause the first radio device to be operative to receive, responsive to the data transmission, a control feedback from the second radio device in a unicast mode at the first radio device, wherein the control feedback is received on a feedback radio resource determined by at least one of the first radio device and the second radio device.

As to a further second device aspect, a second radio device for receiving data using a SL radio communication between a first radio device and the second radio device is provided. The second radio device comprises at least one processor and a memory. Said memory may comprise instructions executable by said at least one processor whereby the second radio device is operative to receive a SA announcing a transmission of the data for the second radio device. Execution of the instructions may further cause the second radio device to be operative to receive the data according to the SA from the first radio device in a unicast mode at the second radio device. Execution of the instructions may further cause the second radio device to be operative to transmit, responsive to the data reception, a control feedback from the second radio device in a unicast mode to the first radio device, wherein the control feedback is transmitted on a feedback radio resource determined by at least one of the first radio device and the second radio device.

As to a still further aspect a communication system including a host computer is provided. The host computer may comprise a processing circuitry configured to provide user data, e.g., depending on a location of the UE or depending on the SL radio communication. The host computer may further comprise a communication interface configured to forward user data to a cellular network for transmission to a user equipment (UE), wherein the UE comprises a radio interface and processing circuitry, a processing circuitry of the cellular network being configured to execute any one of the steps of the first and/or second method aspect.

The communication system may further include the UE. Alternatively or in addition, the cellular network may further include one or more base stations and/or gateways configured to communicate with the UE and/or to provide a data link between the UE and the host computer using the first method aspect and/or the second method aspect.

The processing circuitry of the host computer may be configured to execute a host application, thereby providing the user data and/or any host computer functionality described herein. Alternatively or in addition, the processing circuitry of the UE may be configured to execute a client application associated with the host application.

The first and second radio devices (e.g., the UE), the base station, the communication system or any node or station for embodying the technique may further include any feature disclosed in the context of the method aspects, and vice versa. Particularly, any one of the units and modules, or a dedicated unit or module, may be configured to perform or initiate one or more of the steps of the method aspects.

BRIEF DESCRIPTION OF THE DRAWINGS

Further details of embodiments of the technique are described with reference to the enclosed drawings, wherein:

FIG. 5 schematically illustrates an exemplary environment comprising embodiments of the radio devices of FIGS. 1 and 2;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including 3GPP LTE (e.g., LTE-Advanced or a related radio access technique such as MulteFire) or in a Wireless Local Area Network (WLAN) according to the standard family IEEE 802.11.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Furthermore, embodiments described herein are combinable, e.g., in parts or completely. For example, features indicated by like reference signs may correspond to equivalent or alternative implementations of said features and may be individually exchangeable between the embodiments described herein. While embodiments of the technique are described in the context of V2X communications, such embodiments are readily applicable to any other direct communication between radio devices, e.g., in other scenarios involving device-to-device (D2D) communications.

Figure 1:
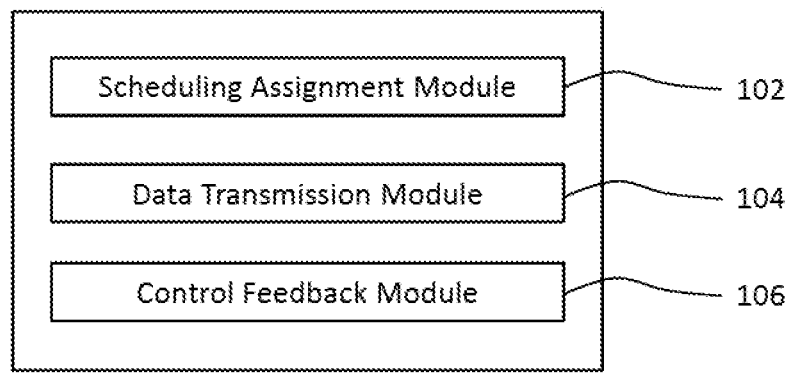
FIG. 1 shows a schematic block diagram of a first radio device for transmitting data using a sidelink radio communication to a second radio device.

FIG. 1 schematically illustrates a block diagram of a first radio device for transmitting data using a sidelink (SL) radio communication to a second radio device. The first radio device is generically referred to by reference sign 100.

The first radio device 100 may also be referred to as a transmitting device or briefly as a transmitter. The second radio device may also be referred to as a receiving device or briefly as a receiver.

The transmitter 100 comprises a scheduling assignment (SA) module 102 that broadcasts a SA. The SA announces a transmission of the data for the receiving device. The transmitter 100 further comprises a data transmission module 104 that transmits the data. The data is transmitted from the transmitter 100 in a unicast mode to the receiver according to the announcement in the SA. The transmitter 100 further comprises a control feedback module 106 that receives a control feedback from the receiver in a unicast mode at the transmitter responsive to the transmission of the data. The control feedback is received on a feedback radio resource determined by at least one of the transmitter 100 and the receiver.

Any of the modules of the receiver 100 may be implemented by units configured to provide the corresponding functionality.

The transmitter 100 and the receiver may be in SL radio communication at least for the transmission of the data from the transmitter 100 and the reception of the control feedback from the receiver.

Figure 2:
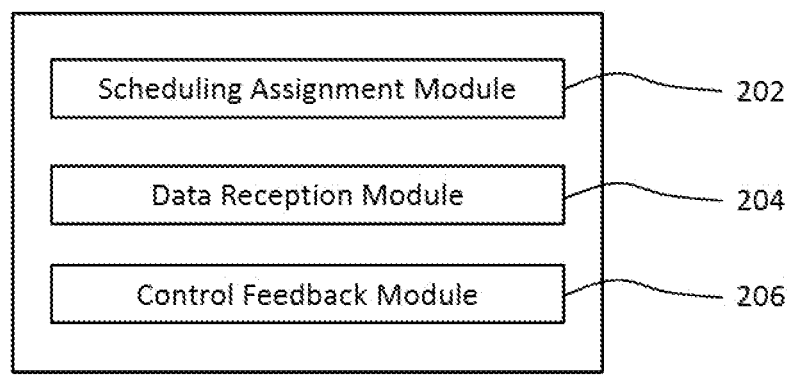
FIG. 2 shows a schematic block diagram of a second radio device for receiving data using a sidelink radio communication from a first radio device.

FIG. 2 schematically illustrates a block diagram of a second radio device for receiving data using a SL radio communication from a first radio device. The second radio device is generically referred to by reference sign 200.

The second radio device 200 may also be referred to as a receiving device or briefly as a receiver. The first radio device may also be referred to as a transmitting device or briefly as a transmitter.

The receiver 200 comprises a scheduling assignment (SA) module 202 that receives a SA. The SA announces a transmission of the data for the receiver 200. The receiver 200 further comprises a data reception module 204 that receives the data according to the announcement in the SA from the transmitter in a unicast mode at the receiver 200. The receiver 200 further comprises a control feedback module 206 that transmits a control feedback from the receiver in a unicast mode to the transmitter responsive to the reception of the data. The control feedback is transmitted on a feedback radio resource determined by at least one of the transmitter and the receiver 200.

Any of the modules of the receiving device 200 may be implemented by units configured to provide the corresponding functionality.

The transmitter and the receiver 200 may be in SL radio communication at least for the reception of the data from the transmitter and the transmission of the control feedback from the receiver 200.

Figure 3:
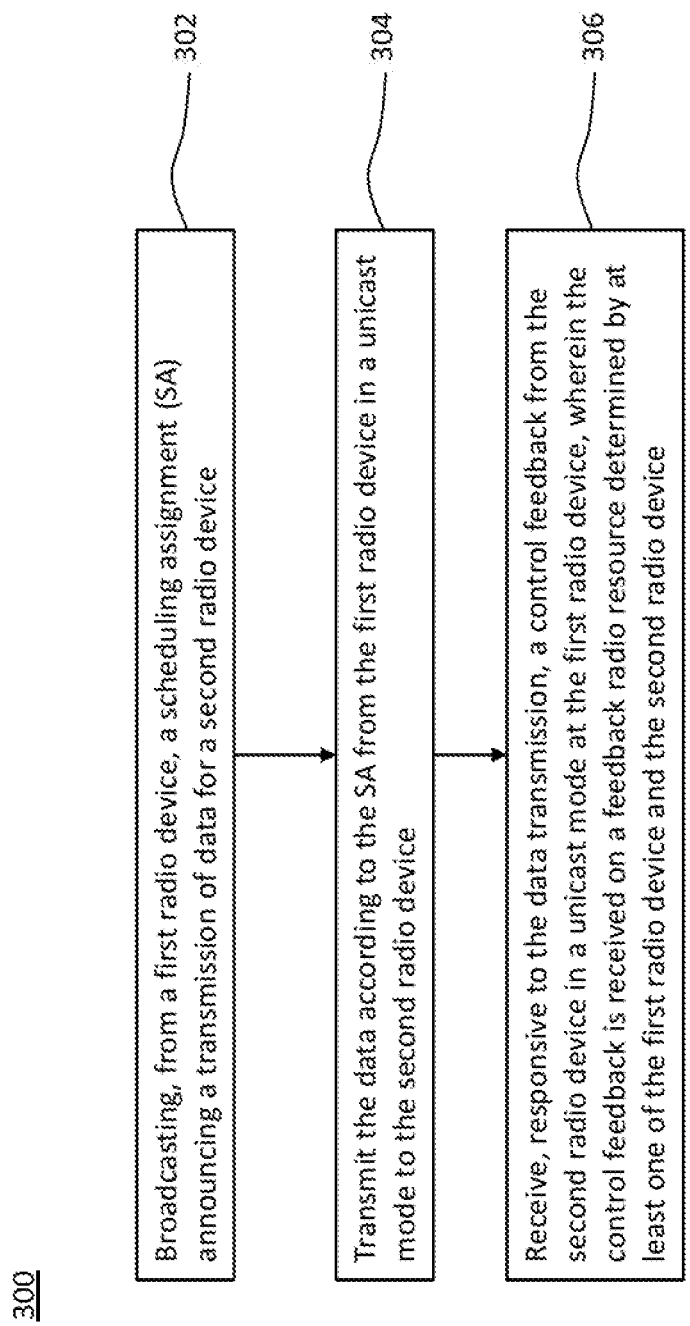
FIG. 3 shows a flowchart for a method of transmitting data in a sidelink radio communication from a first radio device to a second radio device, which method may be implementable by the first radio device of FIG. 1.

FIG. 3 shows a flowchart for a method 300 of transmitting data in a SL radio communication from a first radio device (also: transmitter) to a second radio device (also: receiver). The method 300 comprises or initiates a step 302 of broadcasting, from the transmitter, a scheduling assignment (SA) announcing a transmission of the data for the receiver. The method 300 further comprises or initiates a step 304 of transmitting the data according to the SA from the transmitter in a unicast mode to the receiver. Moreover, the method 300 further comprises or initiates a step 306 of receiving, responsive to the data transmission, a control feedback from the receiver in a unicast mode at the transmitter, wherein the control feedback is received on a radio resource determined by at least one of the transmitting device and the receiving device.

The method 300 may be performed by the transmitter 100. For example, the modules 102, 104 and 106 may perform the steps 302, 304 and 306, respectively.

Figure 4:
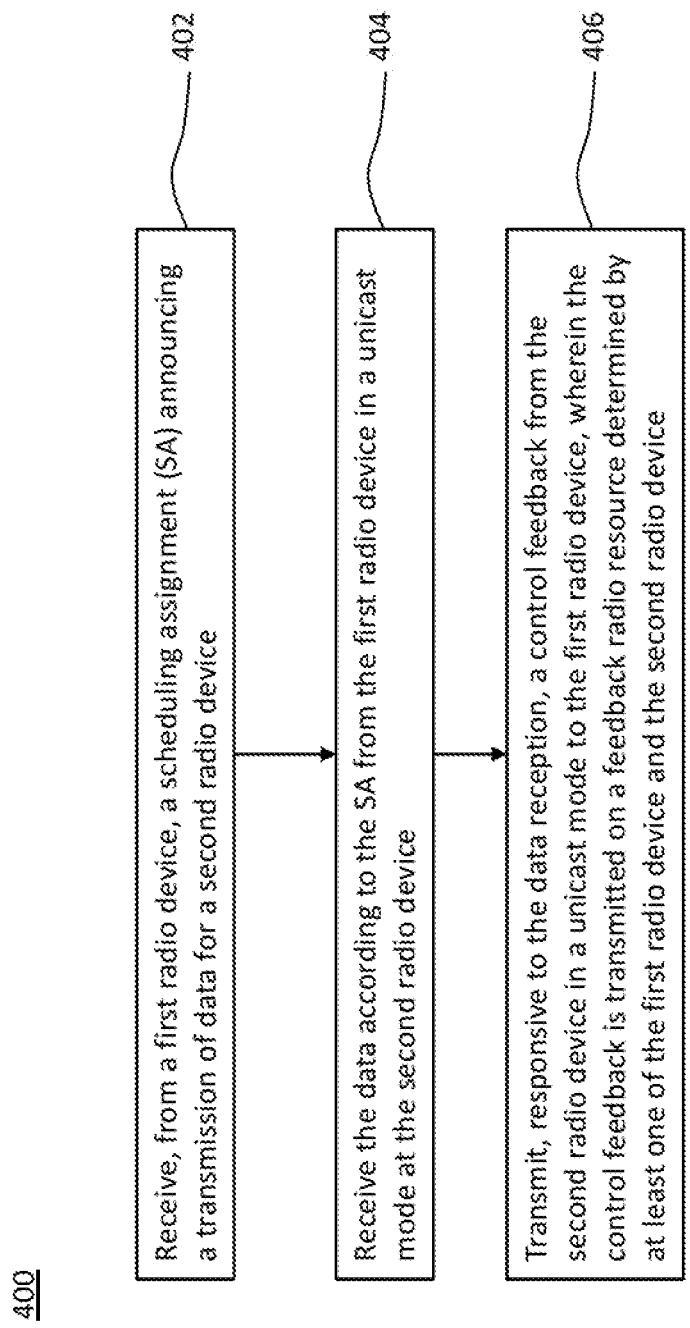
FIG. 4 shows a flowchart for a method of receiving data in a sidelink radio communication from a first radio device at a second radio device, which method may be implementable by the second radio device of FIG. 2.

FIG. 4 shows a flowchart for a method 400 of receiving data in a SL radio communication from a transmitting device to a receiving device. The method 400 comprises or initiates a step 402 of receiving, from a transmitting device, a scheduling assignment announcing a transmission of data for a receiving device. The method 400 further comprises or initiates a step 404 of receiving the data according to the SA from the transmitting device in a unicast mode at the receiving device. Moreover, the method 400 further comprises or initiates a step 406 of transmitting, responsive to the data reception, a control feedback from the receiver in a unicast mode to the transmitter, wherein the control feedback is transmitted on a radio resource determined by at least one of the transmitting device and the receiving device.

The method 400 may be performed by the receiver 200. For example, the modules 202, 204 and 206 may perform the steps 402, 404 and 406, respectively.

Herein, any radio device, e.g., the transmitting device 100 and/or the receiving device 200, may be a mobile or portable station or a radio device wirelessly connectable to the RAN or another radio device. Any radio device may be a user equipment (UE), a device for machine-type communication (MTC) and/or a device for (e.g., narrowband) Internet of Things (IoT).

The technique may be applied to any direct communication between UEs. The methods 300 or 400 may be performed by UEs for allocating resources in unicast sidelink communication with feedback transmissions.

For example, the method 300 may be implemented by the transmitter 100 that allocates, suggests or indicates in the SA broadcasted in the step 302 the feedback radio resources and, optionally, certain transmission and/or reception parameters for the control feedback. The method 400 may be implemented by the receiver 200 that takes the feedback radio resource allocated, suggested and/or indicated in the SA received in the step 402 into account and, optionally, combines the received feedback radio resource with results of its own local sensing procedure. Alternatively or in addition, the method 400 may be implemented by the receiver 200 determining the feedback radio resource. For example, the receiver 200 may broadcast a further SA announcing the feedback radio resource for the transmission of the control feedback for the receiver 100.

FIG. 5 is a descriptive illustration of an embodiment of a radio network 500, e.g., an LTE implementation, comprising embodiments of the transmitter 100 and/or the receiver 200. The embodiment of the radio network 500 includes a V2X scenario. The embodiments of the transmitter 100 and the receiver 200 are configured for vehicular radio communication including functionalities for direct vehicle-to-vehicle (V2V) communication. Optionally, the transmitter 100 and the receiver 200 are further configured for V2X communication, e.g., including communication with pedestrians (V2P) or network infrastructure (V2I).

Embodiments of the technique may be compatible with V2X, e.g., according to 3GPP LTE Release 14 or 15. The SL radio communication may be a V2X communication, which may encompass any combination of direct communication between vehicles, pedestrians and infrastructure. The V2X communication may take advantage of a RAN infrastructure 502, if available. Examples of the RAN infrastructure include a base station 502, e.g., for centralized scheduling. At least basic V2X connectivity may be achievable outside of RAN coverage, e.g., by means of distributed scheduling.

The radio network 500 may comprise areas of RAN coverage. For example, the radio network 500 comprises a stationary RAN including at least one base station 502. Each base station 502 serves at least one cell 504. The base station 502 may be an evolved Node B (eNodeB or eNB) or a Next Generation Node B (gNodeB or gNB).

V2X operation is possible with and without RAN coverage and with varying degrees of direct interaction between the transmitter 100 and the receiver 200 and/or the RAN. Outside of the RAN coverage, the transmitter 100 and the receiver 200 may perform the methods 300 and 400, respectively, in a standalone or RAN-less operation. The methods 300 and 400 may be selectively performed, if the transmitter 100 and/or the receiver 200 are out of a cell 504 served by a base station 502.

Implementing an LTE-based radio interface for the SL radio communication (e.g., a V2X interface) can reduce complexity and/or power consumption of the respective radio devices. Alternatively or in addition, the V2X implementation of the SL radio communication may be advantageous because of economies of scale and/or a tighter integration between communications with a RAN infrastructure (e.g., V2I communications) and SL communications among the radio devices (e.g., V2P and V2V communications), as compared to using a dedicated V2X technology.

V2X communications may carry both non-safety and safety information. Each of the applications or services may be associated with specific requirements sets, e.g., in terms of latency, reliability, capacity, etc.

The increasing need to support vehicular safety and traffic efficiency applications needing continuous status information about surrounding vehicles and asynchronous notifications of events, respectively, has led to the definition of two types of messages for road safety, namely the Cooperative Awareness Message (CAM) and the Decentralized Environmental Notification Message (DENM).

The data may comprise messages for road safety, e.g., as defined by ETSI. The data may comprise at least one of the CAM and the DENM, or a variant thereof for unicast communication. The CAM may enable vehicles, including emergency vehicles, to notify their presence and other relevant parameters in a broadcast fashion, or in a variant thereof, in the unicast mode or multicast mode.

Herein, the unicast mode required for the steps 304, 306 404 and 406 may be implemented by transmitting to one or more destinations according to a multicast mode. That is, the multicast mode may be a multiple realization of the unicast mode and may be distinguished from a broadcast mode (also: broadcasting) in that the one or more destinations a defined by the source of the transmission. For example, the technique may be realized using two or more embodiments of the receiver 200 and the transmission to each of the two or more receivers 200 may realize the "unicast" transmission.

The transmission 304 of the data (e.g., including a CAM) may target other vehicles (e.g., V2V), pedestrians (e.g., V2P) and/or infrastructure (e.g., V2I). The data may originate from and/or be handled by applications performed by the transmitter 100. The data transmission 304 (e.g., including the CAM) may also serves as active assistance to safety driving for normal traffic. The receiver 200 may indicatively check the availability of the data (e.g., the CAM) or the SA for every 100 ms, 50 ms or less, so as to fulfill a maximum detection latency requirement. For example, the latency requirement for pre-crash sensing warning may be 50 ms or less. Alternatively or in addition, the data may relate to further enhanced V2X services, which may require same or stricter requirements on latency.

The transmission 304 of the data (e.g., including a DENM) may be event-triggered. Examples for the event include braking or certain steering maneuvers. The availability of a DENM or the SA may be checked by the receiver 200 for every 100 ms, 50 ms or less. That is, the requirement of maximum latency may be 100 ms, 50 ms or less.

A package size of the CAM and the DENM may vary from 100 bytes (or more) to 800 bytes (or more). A typical package size may be on the order of 300 bytes.

Alternatively or in addition, the data may comprise a Basic Safety Message (BSM) for Distributed Short Range Communications (DSRC), e.g., as specified by the Society of the Automotive Engineers (SAE). Various messages sizes are defined for the BSM.

The data (e.g., the BSMs) may be classified into different priorities, e.g., according to the importance and/or urgency of the data, the message or an underlying service.

Figure 6A:
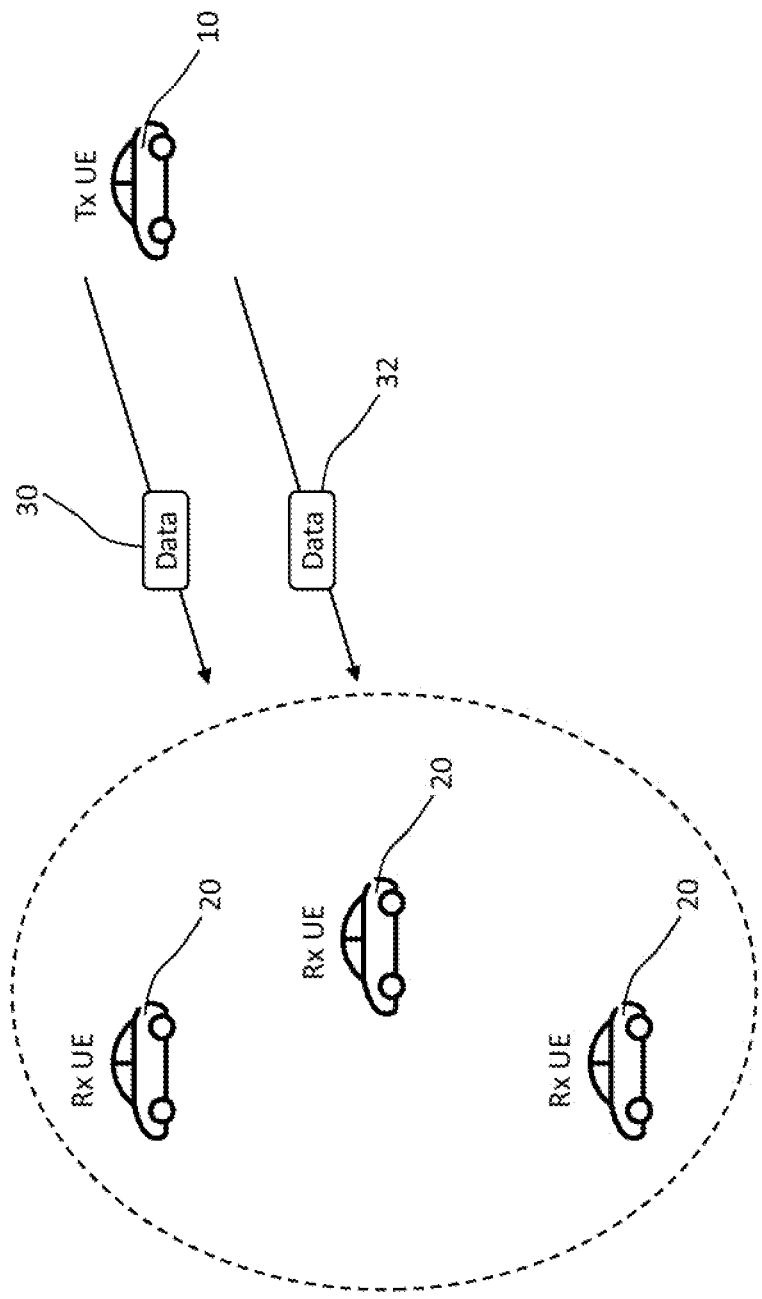
FIG. 6A schematically illustrates a comparative example of a radio environment comprising radio devices in broadcast sidelink radio communication.

FIG. 6A schematically illustrates existing LTE V2X SL communications as a comparative example. The existing SL communications only support broadcast communications, so that it is conventionally not possible for a receiver 20 to provide feedback to a broadcasting transmitter 10. Data 30 has to be blindly retransmitted, as schematically indicated at reference sign 32.

Figure 6B:
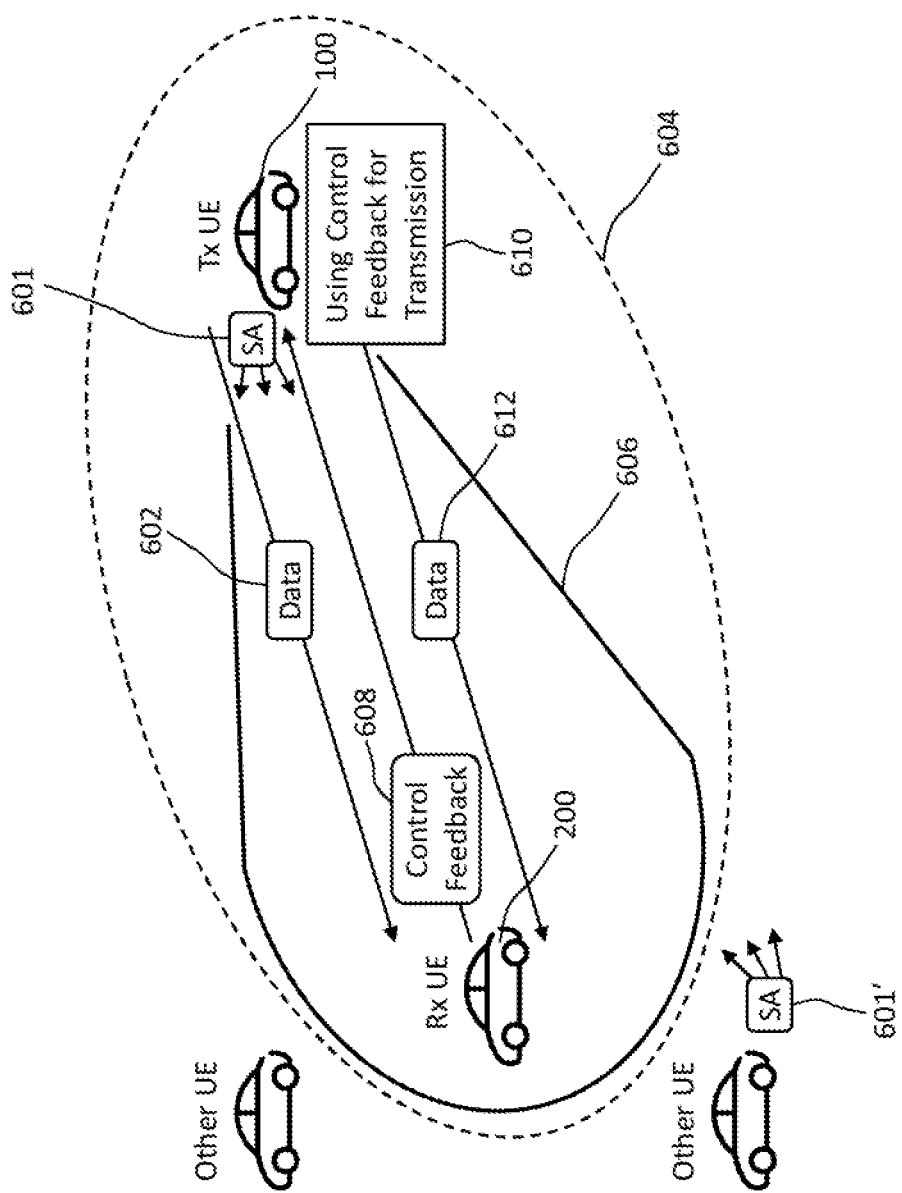
FIG. 6B schematically illustrates an example of a radio environment comprising embodiments of the radio devices of FIGS. 1 and 2 in a unicast sidelink radio communication.

In contrast, embodiments of the technique, e.g., as schematically illustrated in FIG. 6B, may support a feedback-based transmission of data 602 in a SL radio communication 604. For clarity and without limitation, the radio network 500 schematically illustrated in FIG. 6B comprises a V2X scenario. That is, the SL radio communication 604 may comprise a V2X communication.

The transmitter 100 announces in the step 302 the scheduled transmission 304 of the data 602 for the receiver 200 by broadcasting the SA 601. The broadcasted SA 601 is received by other radio devices in proximity to the transmitter 100. The other radio devices may belong to the radio network 500 or may share the same radio spectrum using another radio access technology. The other radio devices may take the announced transmission 304 into account for their transmission, so that a collision at the transmission radio resource used for the data transmission 304 is avoided.

Alternative or in addition, the transmitter 100 takes SA 601' from the other radio devices into account when determining the transmission radio resource announced in the SA 601 and/or used for the data transmission 304.

While FIG. 6B schematically illustrates the transmission 304 of the data 602 in the unicast mode for one receiver 200, a corresponding multicast transmission may be realized by announcing each of two or more receivers 200 as destinations of the data transmission 304, e.g., in the SA 601. Such a multicast transmission is a "unicast" transmission 304 with respect to each of the two or more receivers 200.

Optionally, the SL radio communication 604 may use a beamforming transmission 606 in the unicast mode. A precoding matrix, e.g., applied at the transmitter 100 to an antenna array, may control the beamforming transmission 606.

As indicated at reference sign 610, a further transmission 612 (e.g., a retransmission) from the transmitter to the receiver 200 may be triggered by and/or may depend on the control feedback 608. The control feedback 608 may control advanced communication features, e.g. for a hybrid automatic repeat request (HARQ) process with chase combing and/or an incremental redundancy for the retransmission 612 of the data 602. For example, the control feedback 608 may comprise a HARQ feedback.

For chase combining, the coded data 602 is retransmitted from the transmitter 100 to the receiver 200 responsive to a negative acknowledgment feedback (NACK) in the control feedback 608. A decoder at the receiver 200 combines softbits of multiple coded packets before decoding. This scheme achieves gain with small buffer size in the receiver 200.

The control feedback 608 may control, e.g., for the further transmission 612, at least one of a precoding matrix, a rank of a multiple-input multiple-output channel of the SL radio communication, the redundancy version for the retransmission, a transmit power and a modulation and coding scheme (MCS). Based on the control feedback 608 for the SL radio communication (e.g., a V2X communication) with the unicast (or a corresponding multicast) transmission 304 of the data, the reliability and/or the latency of the data transmission can be improved.

Embodiments of the technique can increase the efficiency of resource utilization and/or the coding gain of soft combining as compared to the blind retransmissions 30 and 32 (e.g., as specified for broadcast radio communications in 3GPP LTE for SL radio communications). Same or further embodiments of the technique can support HARQ feedback with soft combing for a SL unicast transmission 304, so that a number of retransmissions of the data 602 and/or a redundancy version of each retransmission 612 may be controlled by means of the control feedback 608. E.g., the number of retransmissions 612 and/or the redundancy version may be automatically adapted to a channel quality of the SL radio communication 604 based on a result of decoding the data 602 at the receiver 200. The control feedback 608 may be indicative of, or may imply, the decoding result.

The technique may be implemented as a method of allocating radio resources for sidelink feedback transmissions. The SA 601 may be indicative of the feedback radio resource, i.e., a resource allocation for the control feedback 608. The SA 601 and/or the control feedback 608 may be implemented by sidelink control information (SCI).

The broadcast radio resource used in the step 302 and/or the transmission radio resource used for the step 304 may be determined by centralized scheduling (e.g., if the transmitter 100 is within RAN coverage) or decentralized scheduling (e.g., according to LTE V2X sidelink resource allocation).

In 3GPP Release 14 and Release 15 LTE SL V2X framework, resource allocation mode 3 (centralized scheduling) and resource allocation mode 4 (distributed scheduling) are specified, e.g., for so-called PC5-based sidelink communications. The technique may be implemented based on 3GPP LTE SL V2X in combination with transmissions in the unicast mode. In resource allocation mode 3, the base station 502 (e.g., an eNB or gNB) centrally controls the resource allocation of a physical SL control channel (PSCCH) and a physical SL shared channel (PSSCH) for radio resource control (RRC)-connected UE 100 or 200 in its coverage. In mode 4, each UE 100 or 200 may autonomously select radio resources based on a pre-defined common sensing and resource selection protocol. However, the conventional specification for both resource allocation mode 3 and resource allocation mode 4 does not comprise the determining of the feedback radio resource, i.e., the resource allocation of a unicast feedback transmission, since there is no unicast communication specified in the 3GPP Release 14 and Release 15 LTE Sidelink V2X framework.

Any embodiment of the technique may be implemented as an extension of resource allocation mode 3. The broadcast radio resource for the SA 601 and/or the transmission radio resource 602 for UE 100 may be tightly controlled by its serving base station 502.

The steps 302 and 304 may further comprise at least one of the following transmissions and receptions for a mode 3 implementation at the UE 100. As a first mode 3 step (i.e., a transmission), the UE 100 requests resources for transmissions 302 and 304 at the base station 502 using uplink signaling. As a second mode 3 step (i.e., a reception), the base station 502 grants resources for the sidelink transmissions 302 and 304 to the UE 100. As a third mode 3 step (e.g., a transmission), the UE 100 performs the SL transmission on the resources (i.e., the broadcasting radio resource and the transmission radio resource) granted by the base station 502 according to the steps 302 and 304. The sidelink transmission comprises the broadcasting 302 of the SA 601 so that the centralized scheduling is forwarded to other radio devices that are affected by the data transmission 304 and potentially outside of the coverage of the base station 502.

The scheduling grant provided by the base station 502 may be valid for the transmission of a single transport block (TB) representing the data 602, optionally including its retransmission 612. Alternatively, the scheduling grant provided by the base station 502 may be valid for the transmission of multiple TBs (e.g., each representing an instance of the data 602 or collectively representing the data 602), which is also referred to as semi-persistent scheduling (SPS).

Alternatively or in addition, any embodiment of the technique may be implemented as an extension of resource allocation mode 4, which is also referred to as the autonomous mode or distributed scheduling, because the UE 100 makes many decisions related to the SL transmission, i.e., the steps 302 and 304, on its own.

The UE 100 selects time-frequency resources as the broadcasting radio resources and the transmission radio resources to be used for the SL transmission 302 and 304 from a large set of resources configured by the radio network 500 (e.g., the base station 502 prior to the UE 100 leaving the cell 504 of the base station 502) or preconfigured in the UE 100. In other words, the UE 100 performs autonomous resource allocation (also referred to as distributed resource allocation).

A mode 4 implementation at the transmitter 100 makes combined use of two features, namely semi-persistent transmission and sensing-based resource allocation. Semi-persistent transmission exploits the fact that typical safety V2X traffic is (approximately) periodic (i.e., new packets are generated at regular intervals). Since packet arrivals are periodic, a transmitting UE 100 can notify other UEs about its intention to use certain time-frequency resources for the future transmissions 304 by means of the SA 601.

The sensing may comprise monitoring a radio channel to learn the presence of such semi-persistent transmissions from other UEs, i.e., other SAs 601'. In this way, the UE 100 can avoid collisions when selecting its broadcast and transmission radio resources for its own SL transmission 302 and 304. This is also referred to as sensing-based resource allocation.

The control feedback 608 may further provide or control for the SL radio communication 604 any feature for a HARQ process that is conventionally specified for LTE uplink (UL) or LTE downlink (DL). For example, the data transmission may use incremental redundancy for the HARQ process with soft combining. In one variant, the transmitter 100 may increment a redundancy version for the coding of the data for the retransmission 612 responsive to the control feedback 608 comprising a NACK. In another variant, the control feedback 608 may be indicative of the redundancy version.

In any embodiment, the control feedback 608 (e.g., a HARQ feedback, particularly a HARQ-ACK) for the SL data transmission 304 may be transmitted on the PSCCH or PSSCH of the SL radio communication 604. For example, if the HARQ feedback 608 is transmitted on PSSCH, the resource allocation for PSSCH (i.e., the feedback radio resource) may be determined (i.e., scheduled) by the transmitter 100, e.g., as indicated in the SA 601. Alternatively or in addition, the receiver 200 may broadcast a further SA in the PSCCH announcing the control feedback 608 on the PSSCH, if the receiver 200 determines (i.e., schedules) the feedback radio resource.

The transmitter 100 and/or the receiver 200 involved in determining the feedback radio resource may perform channel sensing, so that resource collocations on the shared spectrum of the radio network 500 can be avoided for the transmission 406 of control feedback 608.

In any embodiment, the SA 608 in the step 302 may be implemented by announcing (also: advertising) the data transmission 304 over sidelink control information (SCI). The transmitter 100 may determine (i.e., schedule) the transmission radio resource for the initial transmission 304 of a packet as the data 602 and a further transmission radio resource for a further transmission 612 (or retransmission) of the same packet (e.g., the same data, optionally differently coded) over different time and frequency physical resource blocks (PRBs) and/or different subchannels. In such a way, the packet reception probability can be improved against many factors that may degrade the radio performance e.g., frequency-selective and/or time-selective fading, in-band emission, half-duplexing and collision with other UEs.

The SA 601 (e.g., the SCI comprising the SA) and the data 602 may be transmitted in the same transmission time interval (TTI). For a self-contained implementation of each transmission, e.g., when the same packet or transport block (TB) is transmitted two times, the SCI of each transmission may indicate the PRBs reserved for each transmission and retransmission.

In any embodiment, the control feedback 608 may control a HARQ process in the SL radio communication 604, e.g., according to 3GPP LTE. A HARQ implementation of the technique may supplement an LTE SL according to 3GPP Release 12 or 13 for proximity services (ProSe) and/or national security and public safety (NSPS) and/or an LTE SL according to 3GPP Release 14 or 15 for V2X, since none of these services have been specified before for HARQ feedback.

Noteworthy, blind retransmissions specified for broadcast retransmission in LTE sidelink cannot be directly reused for unicast retransmission, since it can lead to an inefficient resource utilization and lower unnecessarily the potential coding gain of soft combining. Therefore, it is more desirable to support HARQ feedback with soft combing for SL unicast transmission, so that the number of retransmissions and/or the redundancy version of each retransmission can automatically adapt to the SL channel quality based on the result of the decoding.

Alternatively or in addition to a HARQ feedback 608, the control feedback 608 may comprise other feedback information, e.g., a channel state information (CSI, e.g., a CSI report) and/or a transmit power recommendation. The control feedback 608 can comprise any feedback information to support the SL unicast transmission, to assist a MIMO transmission scheme, for transmission mode selection and/or to enable fast automatic gain control (AGC) settling, etc.

The technique may be applied to V2X use cases, e.g., high-density platooning or cooperative maneuver planning or any other V2X use case for which the requirements in terms of data rate, latency, reliability and/or communication range are more stringent than in existing ETSI messages. The respective requirements may be achieved by combining the low latency of the SL radio communication 604 with the efficiency and/or reliability of feedback-based transmission techniques such as a HARQ process.

For clarity and not limitation, embodiments of the technique are described for a HARQ feedback as the control feedback 608. That is, some embodiments given below focus on a HARQ feedback 608 over SL. It should be noted that the same mechanisms (e.g., signaling methods and/or UE behaviors) may also be applied to the transmission of other feedback information 608, e.g., CSI reports, transmit power recommendation, etc.

The features or details for the SL feedback mechanisms described herein below are individually applicable or combinable with any embodiment of the devices 100 and 200 or implementation of the methods 300 and 400 described above. For example, the technique may comprise a set of signaling methods and UE behaviors of indicating and selecting the feedback radio resources for transmitting feedback information 608 over the SL radio communication, e.g., to support efficient SL unicast communications. Furthermore, the embodiments may, at the same time, avoid resource collisions when transmitting the feedback information 608.

Moreover, while 3GPP NR implementations are described, the embodiments may be equally or analogously implemented according to 3GPP LTE or other radio access technologies. That is, the technique may be equally or analogously applicable to any other wireless communication system supporting a unicast mode, e.g. with HARQ, for D2D communication.

Figure 7:
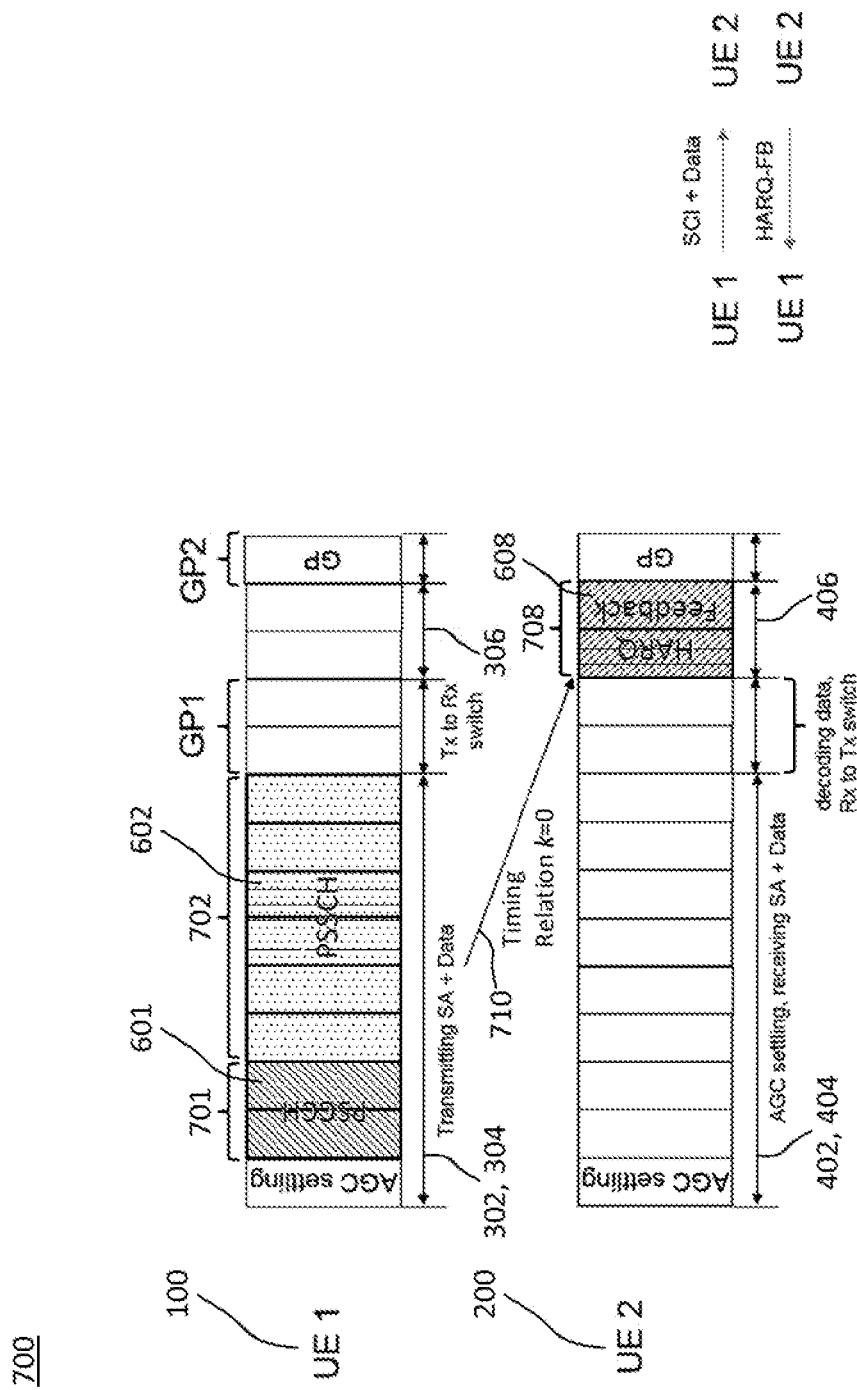
FIG. 7 schematically illustrates a first example for a timing relation between a transmission radio resource and a feedback radio resource used by embodiments of the radio devices of FIGS. 1 and 2 in a unicast sidelink radio communication.
Figure 8:
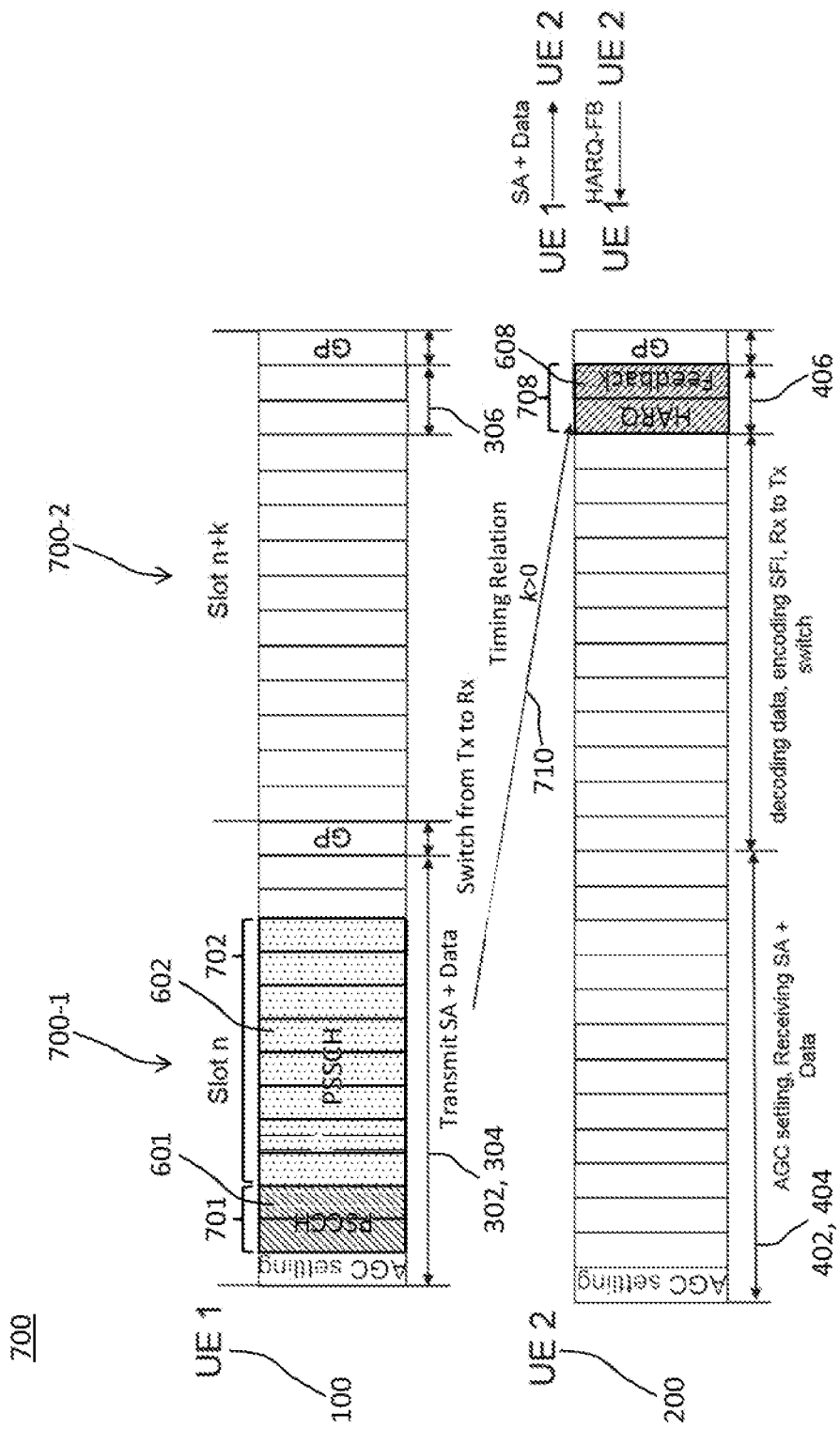
FIG. 8 schematically illustrates a second example for a timing relation between a transmission radio resource and a feedback radio resource used by embodiments of the radio devices of FIGS. 1 and 2 in a unicast sidelink radio communication.

Each of FIGS. 7 and 8 schematically illustrates an example of a radio resource structure for the SL radio communication 604. More specifically, an exemplary structure of transmission time intervals (TTIs) 700 are schematically illustrated in the time domain. The TTI 700 may be a subframe, a slot or any time-domain structure that allows for a unicast data transmission 304 with control feedback 608 (e.g., a HARQ feedback).

Each TTI 700 is schematically illustrated from the perspective of the transmitter 100 and the receiver 200 in the upper and lower part of the figures, respectively, wherein filled areas correspond to a transmit operation. Time increases from left to right. Each rectangle corresponds to one modulation symbol. A broadcast radio resource 701 for broadcasting the SA 601 in the step 302 and/or for receiving the SA 601 in the step 402; a transmission radio resource 702 for transmitting the data 602 in the step 304 and/or for receiving the data 602 in the step 404; and a feedback radio resource 708 for receiving the control feedback 608 in the step 306 and/or for transmitting the control feedback 608 in the step 406 are defined in the time domain.

The radio spectrum (e.g., a channel of the radio network 500) may be a shared spectrum, e.g., unlicensed spectrum. A frequency structure of the radio spectrum may use orthogonal frequency division multiplexing (OFDM). In the frequency domain, each modulation symbol may extend over one or more (e.g., 12) OFDM subcarriers. In a time-frequency grid, each rectangle may correspond to one PRB.

FIG. 7 shows the data transmission 304 and its associated control feedback 608 in the same TTI (e.g., the same subframe or slot). The latter case is also referred to as intra-TTI allocation. The intra-TTI allocation may be advantageous in terms of latency for UEs 100 and 200 with high processing capabilities.

On the other hand, FIG. 8 schematically illustrates the transmission radio resource 702 (for the data transmission 304) and the associated feedback radio resource 708 (for the control feedback 608 associated with the data transmission 304) in different TTIs 700-1 and 700-2 (e.g., different subframes or slots). The latter case is also referred to as inter-TTI allocation. The inter-TTI allocation may require not very high processing capabilities of the UEs 100 and 200, e.g., for a pedestrian UE (P-UE) embodying the receiver 200.

Some embodiments of the transmitter 100 and the receiver 200 may be configured to perform the methods 300 and 400, respectively, using exclusively the intra-TTI allocation for the feedback radio resource 708. Further embodiments of the transmitter 100 and the receiver 200 may be configured to perform the methods 300 and 400, respectively, using exclusively the inter-TTI allocation for the feedback radio resource 708. Still further embodiments of the transmitter 100 and the receiver 200 may be configured to perform the methods 300 and 400, respectively, using selectively the intra-TTI allocation and the inter-TTI allocation for the feedback radio resource 708, e.g., depending on a service type or a priority associated with the data 602.

For the case of FIG. 7, i.e., if the data transmission 304 and its associated control feedback 608 are present in same TTI 700 according to the intra-TTI allocation, the transmitter 100 may determine the feedback radio resource 708 (e.g., besides the broadcasting radio resource 701 and the transmission radio resource 702) by performing a resource allocation procedure. The resource allocation procedure may be an existing resource allocation procedure, e.g., a resource allocation procedure also used for booking a broadcast SL transmission. The technique may be transparent for legacy radio devices in the radio network 500. Examples for the resource allocation procedure comprise any resource allocation procedure specified for LTE SL according to 3GPP Release 14 and/or distributed scheduling according to the resource allocation mode 4.

For the intra-TTI allocation, the transmitter 100 may perform the resource allocation procedure resulting in the TTI 700, wherein a portion of the TTI 700, namely the feedback radio device 708 (e.g., one or more modulation symbols within the TTI 700), is used by the receiver 200 for transmitting the control feedback 608. Since the TTI 700 is the only one TTI that is booked or reserved at a particular time instance by broadcasting the SA 601 in the broadcast radio resource 701 (e.g., within the same TTI 700), an existing resource allocation procedure may be used without further enhancements.

In both intra-TTI allocation and inter-TTI allocation, e.g., as schematically illustrated in FIGS. 7 and 8, respectively, the feedback radio resource may be defined (e.g., at least in the time domain) by a timing relation 710 between the broadcast radio resource 701 and/or the transmission radio resource 702, on the one hand, and the feedback radio resource 708 (e.g., for the HARQ feedback 608), on the other hand. That is, the radio resource 701 and/or 702 in combination with the timing relation 710 may define the feedback radio resource 708 at least in the time domain.

The feedback radio resource 708 may be determined (e.g., at least in the time domain) by determining at least one of the broadcast radio resource 701, the transmission radio resource 702 and the timing relation 710.

The timing relation 710 may be fixed, e.g., the same timing offset k of the timing relation 710 may be used for multiple data transmissions 304 in the SL radio communication 604 or in the radio network 500. At the transmitter 100 and/or the receiver 200, the fixed timing relation 710 may be configured (e.g., by the radio network 500 or upon establishing the SL radio communication 604) or may be predefined (e.g., hardcoded and/or defined by a technical standard).

Alternatively or in combination, the timing relation 710 may be variable. Different data transmissions 304 may use different timing relations 710. The transmitter 100 may signal the timing relation 710, e.g., in the SA 601 that announces the data transmission 304 or in further SCI. Alternatively, or for modifying a transmitter-signaled timing relation 710, the receiver 200 may signal the timing relation 710, e.g., in a further SA announcing the transmission 406 of the control feedback 608 or in further SCI.

In the frequency domain, the broadcast radio resource and/or the transmission radio resource may define the feedback radio resource. For example, the feedback radio resource may use (at least partly) the same channel or shared spectrum also used by the broadcast radio resource and/or the transmission radio resource.

For the intra-TTI allocation, e.g., as illustrated in FIG. 7, the timing relation 710 is "n→n+0" in units of TTIs, e.g., for fast UEs 100 and 200. That is, the TTI 700 (with index n) carrying the SA 601 and/or the data 602 also carries the control feedback 608. In other words, the TTI 700 (with index n) comprising the broadcasting radio resource 701 and/or the transmission radio resource 702 also comprises the feedback radio resource 708.

For the inter-TTI allocation, e.g. as illustrated in FIG. 8, the timing relation 710 is "n→n+k" in units of TTIs for an integer k>0, which may also be referred to as timing offset. The timing relation "n→n+k" is the time difference or timing offset k in units of TTIs between the transmission 304 of the data 602 and the transmission 406 of the control feedback 608, e.g., for normal UEs 100 and 200. More specifically, the timing relation 710 is the time lag between the transmission radio resource 702 and the feedback radio resource 708. The timing relation "n→n+k" is defined in units of TTIs, so that k=1 denotes subsequent TTIs. That is, the TTI 700-1 with index n carrying the SA 601 and/or the data 602 defines the TTI 700-2 with index n+k carrying the control feedback 608. More specifically, the TTI 700-1 with index n comprising the broadcasting radio resource 701 and/or the transmission radio resource 702 defines the TTI 700-2 with index n+k comprising the feedback radio resource 708 for the control feedback 608.

The announcing of the data transmission 304 in the step 302 and the data transmission 304 are collectively referred to as transmission 302-304. The following to description mainly discloses features for the case k>0. That is, the transmission 302-304 and the associated control feedback 608 occur in different TTIs 700-1 and 700-2, e.g., different subframes or slots, respectively. Noteworthy, the case k>0 may render more complications for an autonomous resource selection procedure and the corresponding signaling and/or UE behaviors, as compared to the case k=0.

First implementations of the methods 300 and 400, respectively, for the case k>0 enhance an autonomous resource selection procedure for the transmission 302-304 in the presence of feedback information 608 in a TTI 700-2 other than the TTI 700-1 used for the transmission 302-304 by reserving or booking multiple subframes at a particular time instance using the same frequency allocation (e.g., the same subchannels or PRB). The first implementations may be simple and straightforward. For example, no knowledge as to the processing capabilities of the receiver 200 is required at the transmitter 100.

The first implementations may be further improved in terms of spectrally efficient as feedback information is of very small size and may not require many resources for transmission. Furthermore, the information about the multiple subframe reservation also needs to be included in the SA 601, e.g., in the SCI and/or on the PSCCH, which contributes to the signaling overhead.

Second implementations of the methods 300 and 400, respectively, may achieve a more flexible signaling design. Furthermore, same or further implementations do not only increases resource utilization but keep the signaling overhead for the SL control feedback as minimal as possible. More specifically, the signaling overhead for determining any of the radio resource 701, 702 and 708 and/or for booking any of these radio resources (e.g., by broadcasting the SA 601), which is collectively referred to as the UE behavior, may be reduced compared to the first implementations.

Moreover, same or further implementations may reduce or minimize the radio resource collisions with other data and control signaling transmissions.

For example based on the signaling design, any embodiment of technique may apply at least one of the following two variants for determining the feedback radio resource 708 (e.g., for SL HARQ feedback).

A first variant uses the fixed timing relation 710, "n→n+k", between data transmission 304 and control feedback reception 306. The fixed timing relation 710 may be configured or predefined based on UE capability, particularly the processing capability of the receiver 200 (e.g., for decoding the received data 602, performing measurements or estimating the channel). Alternatively or in addition, the fixed timing relation 710 may be configured or predefined based on UL configurations and/or DL configurations, e.g., if UL TTIs (e.g., slots) are used for SL radio communication. Alternatively or in addition, the fixed timing relation 710 may be configured or predefined based on a service type or a priority associated with the data 602. As an advantage, little control signaling overhead is required to announce (also: indicate) the determined feedback radio resource 708 used for transmitting the control feedback 608.

A second variant uses a variable timing relation 710 between data transmission 304 and control feedback reception 306, e.g., to enable a flexible timing of the signaling. As an advantage, the signaling radio resources, e.g., the broadcast radio resource 701 for the SA 601 and/or the feedback radio resource 708 for the control feedback 608 may be flexibly determined by at least one of the transmitter 100 and the receiver 200. The variable timing relation 710 may depend on the processing capabilities of the transmitter 100 and/or the receiver 200. For example, a receiver 200 with higher processing capability may be able to transmit the control feedback 608 in the step 406 earlier as compared to other radio devices (e.g., another embodiment of the receiver 200) with lesser processing capability.

In any embodiment, particularly according to the first variant or the second variant, a control field (e.g., a timing control field) may be included in the SA 601 (e.g., in the SCI and/or on the PSCCH). The control field may be indicative of the feedback radio resource 708 determined by the transmitter 100. The control field included in the SCI is also referred to as SCI field.

The control field may be indicative of the presence of the control feedback 608 (also: feedback information). Alternatively or in addition, the timing control field may be indicative of the timing relation k. The timing control field may be expressly indicative of the timing relation 710 by including a value for k or by including an index i referring to one timing relation $k_i$ out of a set or pattern of timing relations $[k_1, k_2, \ldots]$. Alternatively, the timing control field in the SA 601 broadcasted by the transmitter 100 may be indicative of a pattern for the timing relation 710 between the reception 306 (or the transmission 406) of the control feedback 608 and the transmission 304 (or the reception 404) of the data 602 associated to the SA 601 (e.g., associated to the SCI). The receiver 200 may select one of the timing relations 710 in the pattern and announce the usage of the selected timing relation 710 for the feedback radio resource 708 by broadcasting a further SA in or prior to the step 406.

In any embodiment according to the first variant, the timing relation 710 may be fixed. In any embodiment according to the second variant, a pattern for the timing relation 710 may be fixed. For instance, the fixed pattern may comprise at least one fixed timing relation 710. In any embodiment or variant, a fixed timing relation k may be configured by the radio network 500 or predefined according to a technical specification or a technical standard.

A fixed timing relation 710 (e.g., according to the first variant or within a fixed pattern for the second variant) may depend on a worst-case processing capability of a UE in the radio network 500. Alternatively or in addition, a fixed or variable timing relation k may depend on the type of SL service and/or priority of the SL service, which service is going to transmit or receive the data 602. For example, the smallest k may be associated to services with tight latency requirements, and/or the highest k may associated to services with more relaxed latency requirements.

The value of k for a fixed timing relation 710, a fixed pattern or a range of supported values may result from a negotiation or handshake radio communication protocol between the transmitter 100 and the receiver 200 in the SL radio communicating 604 with each other, e.g., during a connection setup procedure (e.g. discovery procedure). The smallest or largest value of k supported by (e.g., both) the transmitter 100 and/or the receiver 200 involved in the SL radio communication 604 may be selected as the (e.g., fixed or variable) timing relation 710 between the control feedback 608 (e.g., a HARQ feedback) and the data transmission 304.

The control field in the SA 601 (e.g., the SCI field in the SCI) may be implemented by only 1 bit or multiple bits, each bit being indicative of the presence of the control feedback 608 (e.g., any feedback information) according to the (e.g., configured, predefined or individually signaled) timing relation k. In the case of multiple bits, the i-th bit may be associated with the timing relation $k_i$ of the pattern.

For instance, if the respective bit is set to "1" in the control field of the SA 601 (e.g., in the SCI) transmitted in the TTI n (e.g., the subframe n), the control field is indicative of the control feedback 608 being announced, scheduled or expected in the TTI n+k (e.g., subframe n+k). That is, the SA 601 announcing the transmission radio resource 702 for the data transmission 304 also announces the feedback radio resource 708 as determined by the transmitter 100, wherein determining the transmission radio resource 702 implicitly determines the feedback radio resource 708 due to the fixed (e.g., predefined or configured) or expressly indicated timing relation k.

Similarly, if the bit (e.g., the i-th bit associated with the timing relation $k_i$ of the pattern) in the control field is set to "0" in the SA 601 (e.g., in the SCI) transmitted in the TTI n (e.g., the subframe n), the control field indicates that no control feedback 608 (i.e., no feedback information) is present in a subframe n+k. An advantage of signaling the presence of the control feedback 608 in the SA 601 (e.g., in the SCI) is that the resources can be shared between the feedback and the data physical channel.

For example, if a TTI (e.g., a subframe) does not contain any feedback radio resource 708 (which may also be referred to as physical SL feedback channel or PSFCH) in the last few modulation symbols, the transmitter 100 may use the whole TTI (e.g., the whole subframe) including the last modulation symbols for actual data transmissions and, hence, increase the resource utilization.

Figure 9:
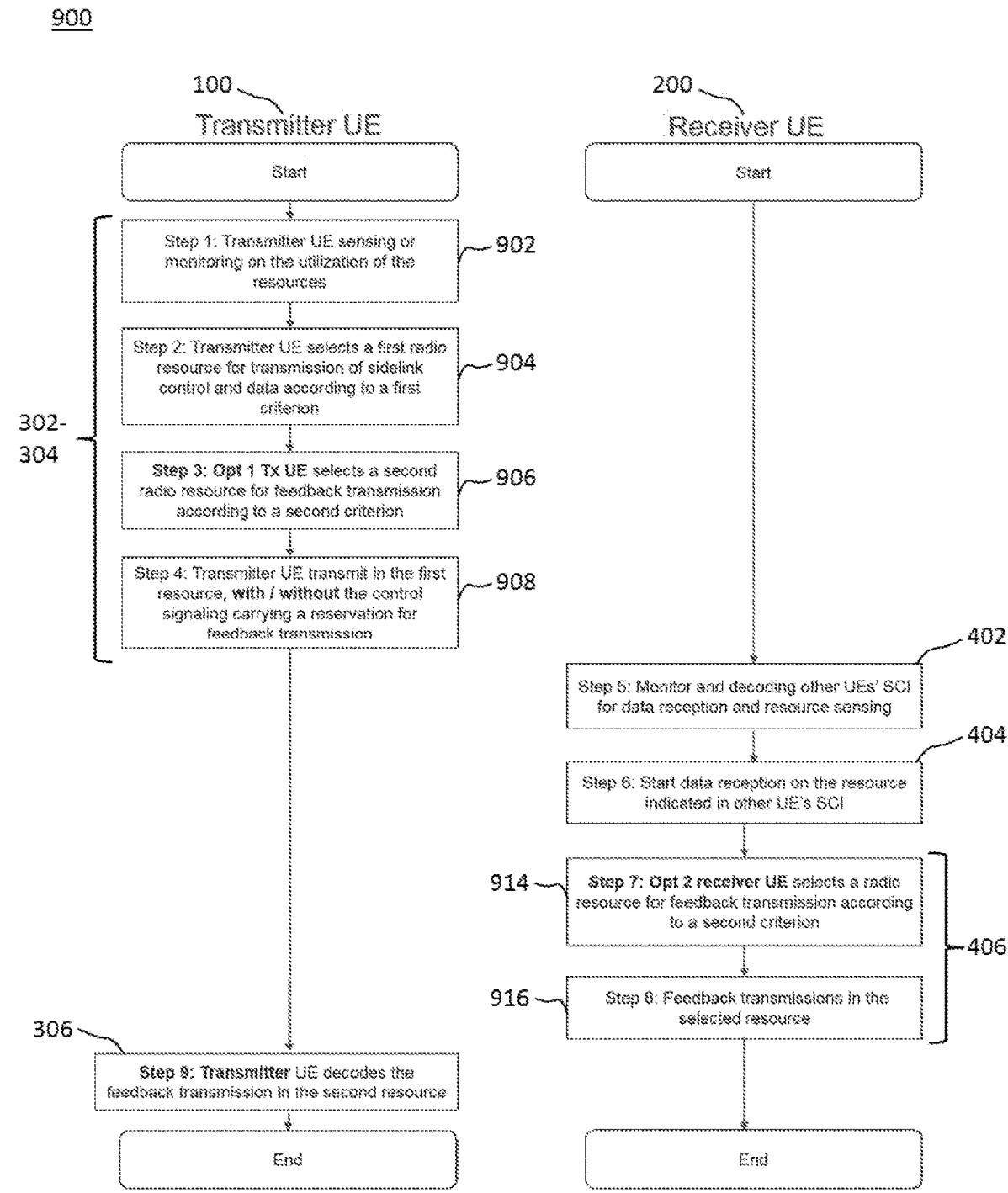
FIG. 9 shows a flowchart for exemplary implementations of the methods of FIGS. 3 and 4.

FIG. 9 shows a flowchart 900 for exemplary implementations of the methods 300 and 400 performed by the transmitter 100 and the receiver 200, as shown at the left hand and right hand sides, respectively. The flowchart 900 comprises examples for UE behaviors of selecting and signaling the feedback radio resource 708 for the control feedback (briefly: feedback), e.g., a HARQ feedback.

The implementations of the methods 300 and 400 according to the flowchart 900 may be combined with any embodiment described herein, particularly the first or second variant. In a step 904, the transmitter 100 determines at least the broadcast radio resource 701 and the transmission radio resource 702, e.g., by requesting SL radio resources from a base station 502 according to SL resource allocation mode 3, or by sensing or monitoring the shared radio spectrum of the radio network 500 in the step 902 for distributed scheduling, e.g., according to SL resource allocation mode 4. The broadcast radio resource 701 and the transmission radio resource 702 are collectively referred to as a first radio resource, e.g., as both radio resources 701 and 702 are comprised in one TTI.

In addition to the step 904 of determining the radio resources 701 and 702 for SL control broadcasting 302 and SL data transmission 304, respectively, the feedback radio resource 708 is optionally determined at the transmitter 100 according to the step 906.

A transmitting step 908 comprises both the broadcasting 302 of the SA 601 and the transmission 304 of the data 602. Since the steps 902 and 904 determine the radio resources 701 and 702 used in the step 908, the transmission 302-304 may be implemented by at least the steps 902, 904 and 908, optionally further including the step 906.

The SA 601 may be indicative of the feedback radio resource 708 determined in the optional step 906. To this end, the SA 601 may comprise a feedback-dedicated control signaling in the broadcast radio resource 701, e.g., the control field (particularly the timing control field). The implementation of the method 300 shown at the left hand side may be combined with any embodiment of the transmitter 100 determining the feedback radio resource 708 according to the step 906. The feedback radio resource 708 is also referred to as a second radio resource.

In any embodiment or implementation, the transmitter 100 may determine the feedback radio resource 708 in the step 906 by selecting (e.g., based on the step 902 and/or the step 904) among a predefined and/or network-configured pattern $[k_1, k_2, \ldots]$ of timing relations $k_i$. Each of the timing relations $k_i$ may define a time difference between the reception 404 of the data 602 and the transmission 406 of the control feedback 608 associated to the data 602. More specifically, the timing relation $k_i$ indicates that the feedback radio resource 708 associated with the transmission radio resource 702 in the TTI n (e.g., the n-th slot or subframe) is in the TTI n+$k_i$ (e.g., the slot or subframe with index n+k). For the second variant, the value of the timing relation $k_i$ (e.g., indicated in or referred to in the SA 601) may be different for different type of services or for different priorities associated to the different services and/or different priorities associated with the data 602.

In any embodiment, implementation or variant (e.g., to the benefit of a resource allocation procedure in the radio network 500 and particularly for distributed scheduling without a base station 502), signaling (e.g., announcing or booking) by means of the SA 601 the feedback radio resource 708 (e.g., the corresponding TTI, slot or subframe) in which the control feedback 608 will be transmitted in the step 406 enables other radio devices in the radio network 500 to become aware of the presence of the control feedback 608. Based on this information, the TTI n+k (e.g., the subframe or slot n+k) can be either partially (e.g., only the last few modulation symbols) or completely skipped by the other radio devices for their transmissions.

The SA 601 may further be indicative of PRBs, subchannels and/or a MCS to be used for transmitting the control feedback in the step 406.

For example, the control field is included in the SA 601 (e.g., in the SCI and/or on the PSCCH) broadcasted from the transmitter 100. For the second variant, the control field may be indicative of the timing relation 710, or a pattern of timing relations 710, between the transmission 406 (or reception 306) of the control feedback 608 and the transmission 304 (or reception 404) of the data 602 associated to the SA 601. The control field may comprise a number of bits, e.g., depending on the number of timing relations 710 (e.g., in the pattern) supported for the SL radio communication 604.

By reading (e.g., receiving and decoding) the control field, the other radio devices are aware of the feedback radio resources already scheduled for the feedback transmission 406. The other radio devices may be further embodiments of the transmitter 100 or may implement at least the steps 902 and 904. For example, after reading the control field according to the step 902, in the step 904, when the other radio devices perform their resource selection for control and data transmissions, they exclude the already scheduled feedback transmission resources, optionally in addition to resource exclusion criteria or resource selection criteria already existing for data and control transmissions without an associated control feedback. In some cases, only a single timing relation 710 is allowed per carrier or per resource pool.

In any embodiment, the processing capability (e.g., indicative of fast HARQ or normal HARQ) may be exchanged between the transmitter 100 and the receiver 200 during the connection establishment phase or pairing phase for the unicast SL radio communication 604, e.g. discovery procedure.

In same or another embodiment, for the variable timing relation 710 between data transmission 304 and feedback transmissions 406 (e.g., according to the second variant), the SA 601 (e.g., signaled in the SCI and/or on the PSCCH) may comprise an explicit indication of (e.g., exact or absolute) time and/or frequency allocated for the feedback radio resource 708 carrying the control feedback 608. For example, the SA 601 may comprise 1 bit per subchannel (or PRB) and/or TTI (e.g., subframe or slot). A bit corresponding to a certain subchannel and/or TTI is indicative of a reservation or booking of the corresponding feedback radio resource 708 for that subchannel and TTI, if the corresponding bit is set to "1". This allows for even better resource utilization on the cost of increased overhead as SCI. According to the step 904 in FIG. 9 (in which step the transmitter 100 determines radio resource 701 and 702 for control signaling 302 and data transmission 304, respectively), the transmitter 100 decodes the SCI (e.g., SAs) of other radio devices which may be indicative of a feedback radio resource (e.g., a HARQ feedback resources) as well as reserved broadcast and transmission radio resources (i.e., control signaling broadcast and data transmission resources) so as to minimize or avoid resource collisions by not selecting those radio resources reserved for (e.g., data and control) transmissions from other radio devices as well as for the feedback transmissions from other radio devices.

In some other embodiment, the feedback radio resource 708 (e.g., for HARQ feedback) cannot be indicated explicitly at all in SCI, in which case avoidance of resource collisions between feedback transmission resource 708 and control or data transmission resources 701 and 702 among different radio devices is the responsibility of the resource selection behavior in the step 904 of the transmitter 100, e.g., based on channel sensing in the step 902.

At the receiver 200, the transmission 406 of the control feedback 608 may comprise an optional step 914 of determining the feedback radio resource 708 used in the feedback transmission 916. The feedback radio resource 708 may be determined solely based on monitoring and/or sensing the shared radio spectrum in the step 402, e.g., if the transmitter 100 does not determine, indicate or suggest a feedback radio resource. Alternatively, the feedback radio resource 708 may be determined based on both a local monitoring and/or sensing of the shared radio spectrum at the receiver 200 in the step 402 and the SA 601 from the transmitter 100 being indicative of one or more (e.g., candidates for) feedback radio resources.

Figure 10:
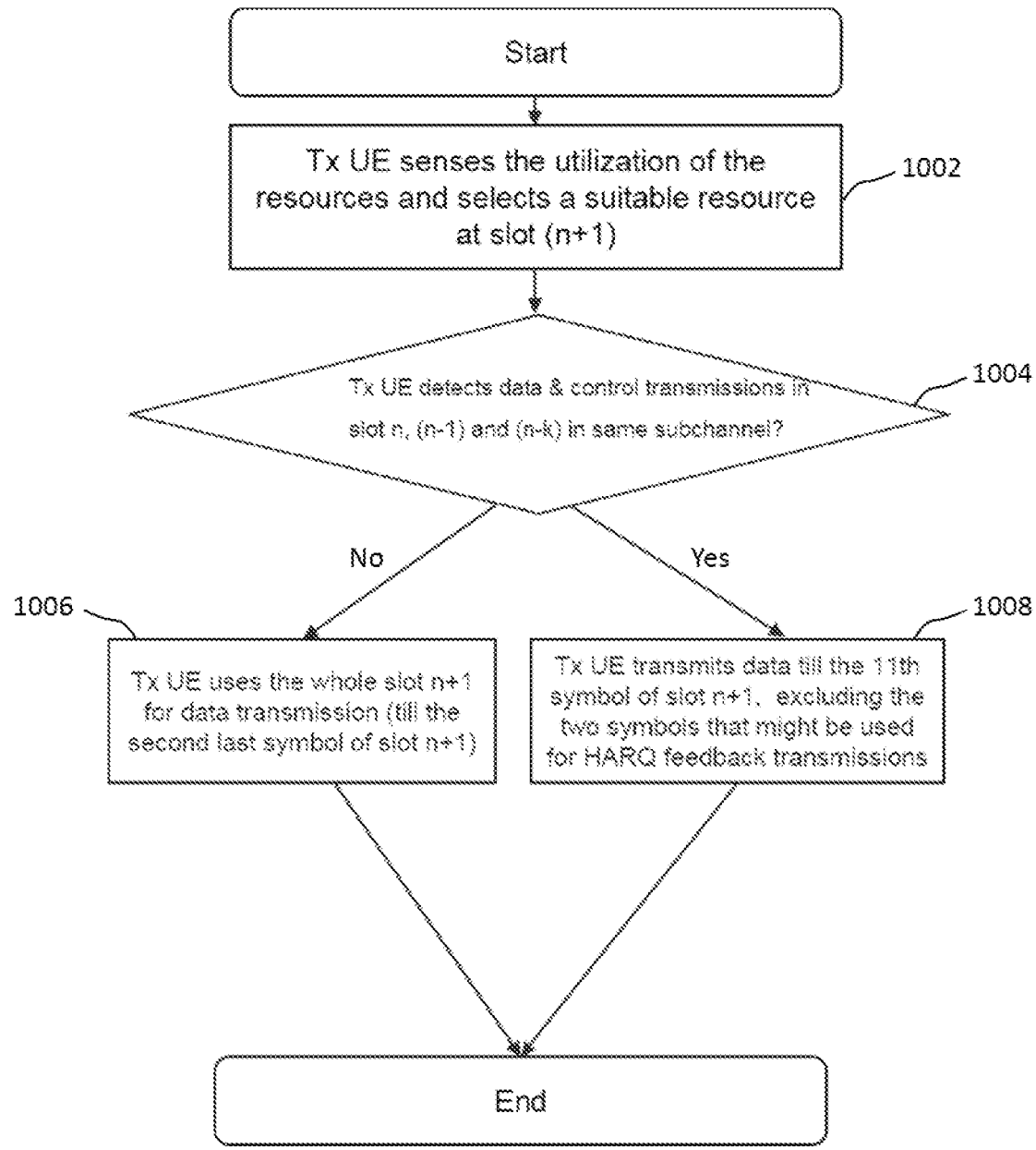
FIG. 10 shows a flowchart for an exemplary implementation of a step of determining a transmission radio resource in the presence of a control feedback on a sidelink radio communication.

FIG. 10 shows a flowchart for an exemplary implementation of the step 904 of the method 300. In a substep 1002, based on sensing the shared spectrum (e.g., in the step 902), the transmitter 100 determines the TTI n+1 (e.g., the slot with index n+1) for a SL data transmission 302-304 on a given subchannel as an example for the shared spectrum. In the substep 1004, the transmitter 100 further senses or monitors in the TTI n, the TTI (n−1) and the TTI (n−k) on the same subchannel to detect whether there is a control signaling (e.g., on the PSCCH) and/or a data transmission (e.g., on the PSSCH). Herein, the value for k may be 2, 3, 4, etc., that is, k>1.

If the transmitter 100 does not detect a control signaling (e.g., on the PSCCH) or data transmission (e.g., on the PSSCH) in the TTI n on the subchannel, this may imply that there will be no transmission 406 of control feedback 608 (e.g., no HARQ feedback) in the TTI n+1. Hence, the transmitter 100 uses at reference sign 1006 the whole TTI n+1 for its data transmission 304. More specifically, allowing for the last duration symbol in the TTI as a guard period (GP), the data may be transmitted (e.g., on the PSSCH) till (and including) the second last modulation symbol of the TTI n+1, e.g., including the first to 13th modulation symbol.

Otherwise, at reference sign 1008, the transmitter 100 transmits the data 602 (e.g., on the PSSCH) till the 11th modulation symbol of the TTI n+1, i.e., excluding the modulation symbols (e.g., the 12th and 13th modulation symbol in same TTI) that might be used for the transmission 406 of the control feedback 608 (e.g., HARQ feedback) to avoid resource collisions.

In some cases, for variable timing relation 710 between data and feedback transmissions, the exact timing relation 710 is determined based on another field of SA 610 or SCI, e.g., a field other than the timing control field dedicated to the timing relation 710. For example, a priority field may be used so that the control feedback 608 for data 602 (or corresponding data packets) associated with high priority is transmitted faster (e.g., earlier) than the control feedback 608 for data 602 associated with low priority. Alternatively or in addition, for small amounts of data 608 or data 608 belonging to small data packets (e.g., containing less than a certain threshold number of bits or using less radio resources than a certain threshold number), the control feedback 608 may be transmitted faster (e.g., earlier) than the control feedback 608 for greater amounts of data 602 or data 602 belonging to bigger data packets.

An implementation of the step 906 in FIG. 9 for the method 300 and/or for the step 914 in FIG. 9 for the method 400 (i.e., for determining the feedback radio resource 708 at the transmitter 100 or the receiver 200) may be based on at least one, each or any subcombination of the following factors. A first factor comprises a specific format of the control feedback 608. The radio device 100 or 200 may decode a SA (or other SCI) received from another radio device, which is indicative of a specific format that defines the position of the reserved (e.g., HARQ) feedback radio resource 708 (e.g., in terms of modulation symbols within the TTI). Based on the specific format, the transmitter 100 may determine a TTI for the transmission 302-304, in which TTI the last few modulation symbols are not occupied by data transmissions or other HARQ feedback transmissions. The specific format may encompass a frame structure format, wherein the last symbol, the two last symbols or the X last symbols in the TTI are not occupied for data transmissions.

A second factor comprises a processing capability of the receiver 200. A third factor comprises a service requirement (e.g., latency and/or reliability) of the data 608 or of a corresponding data packet to be transmitted. A fourth factor comprises a result of locally sensing the shared spectrum at the radio device 100 or 200, e.g., in case the SA (or other SCI) from another radio device is not indicative of the format used by the other radio device for the (e.g., HARQ) feedback radio resource. Herein, the "other" radio device may encompass any radio device not involved in the SL radio communication between the radio devices 100 and 200.

An example of implementing the fourth factor comprises the radio device 100 or 200 determining the (e.g., HARQ) feedback radio resource 708 in the following way. Based on sensing the shared spectrum at the radio device 100 or 200, the radio device 100 or 200 determines an empty TTI n+1 (e.g., a slot n+1) for the feedback radio resource 708 (e.g., for the SL HARQ feedback transmission 406) on a given subchannel as an example of the shared spectrum. The respective radio device 100 or 200 further detects whether there is control signaling (e.g., on the PSCCH) or a data transmission (e.g., on the PSSCH) in the TTI n, the TTI (n−1) and TTI (n−k) on the given subchannel. If the respective radio device 100 or 200 detects no control signaling and no data transmission in any of these TTIs on the given subchannel, the detection result may imply that there will be no other (e.g., HARQ) feedback transmission in the TTI n+1. Hence, the transmitter 100 indicates, and/or the receiver 200 uses, the TTI n+1 for the (e.g., HARQ) feedback transmission 406, e.g., the second last modulation symbol or the 12th and 13th modulation symbols of the TTI n+1. Otherwise, the respective radio device 100 or 200 determines the next empty TTI n'+1 on the given subchannel repeats the further detection in the TTI n, the TTI (n'+1) and TTI (n'−k) until it finds a slot that satisfy the requirement. Herein, "detecting" may be implemented by sensing or monitoring the relevant modulation symbols within the respective TTIs.

Alternatively or in addition to any embodiment, implementation or variant, the receiver 200 may determine the feedback radio resource 708. In other words, the receiver 200 may be responsible for selecting the feedback radio resource 708, e.g., according to the step 914 in FIG. 4. Furthermore, the choice of determining the feedback radio resource 708 by the transmitter 100 or the receiver 200 may be predefined (e.g., manually set or hardcoded at the respective radio device) or configured by the radio network 500. The radio network may configure (e.g., trigger) the respective radio device 100 or 200 to either activate or deactivate the determination 914 of the feedback radio resource 708, e.g., by broadcasting from the base stations 502 a radio resource control (RRC) system information block (SIB). Furthermore, the transmitter 100 may signal in the SA 601 or other SCI whether the transmitter 100 performs the step 906 or the receiver 200 performs the step 914.

Any embodiment may further be configured for the allocation (i.e., the determination 906 and/or 914) of the feedback radio resource 708 (e.g., for a HARQ feedback) in case a feedback radio resource 708 indicated in the SA 601 (e.g., in the SCI) from the transmitter 100 is missed by the receiver 200. In such a case, a set of (e.g., periodic) fallback radio resources may be used by the receiver 200 in the step 914 to transmit the control feedbacks 608 (e.g., HARQ feedbacks) in the step 406 (specifically in the step 916). The set of (e.g., periodic) fallback radio resources may depend on a set of transmit parameters such as PRBs, transmitting power, TTI (e.g., subframe or slot), MCS, etc. Alternatively or in combination, the set of (e.g., periodic) fallback radio resources may be predefined or configured by the radio network 500 and/or exchanged or forwarded between the radio devices 100 and 200 during the connection establishment procedure.

Criteria for the usage of the set of (e.g., periodic) fallback radio resources may also be predefined or network-configured at the transmitter 100 and/or the receiver 200. For example, the set of (e.g., periodic) fallback radio resources shall only be utilized by the receiver 200 if no SA 601 (e.g., in the SCI) in the step 402 and/or no data transmission in the step 404 has been detected at an embodiment of the receiver 200 from one or more embodiments of the transmitter 100 (which is or are paired with the embodiment of receiver 200) during the last X TTIs (e.g., subframes). The number of X TTIs may be greater than 10 or 100 TTIs. Another criterion may be fulfilled if no SA 601 (e.g., in the SCI) and/or no data transmission has been detected within Y TTIs (e.g., subframes) from the transmitter 100 since the last (e.g., HARQ) control feedback transmitted by the receiver 200. The threshold values X and/or Y may be predefined at the radio devices 100 and 200 or may be configured by the radio network 500.

The (e.g., HARQ) control feedbacks 608 transmitted in such fallback radio resources at a TTI n (e.g., a subframe n) may provide feedback information related to all the (e.g., HARQ) transmission processes that were or have been ongoing between the transmitter 100 and the receiver 200 at or since the time n-X and n-Y, respectively. Alternatively, the (e.g., HARQ) control feedbacks 608 comprise information related to all possible (e.g., HARQ) transmission processes that can be transmitted in parallel, e.g., a maximum number of 8 (e.g., HARQ) transmission processes. In particular, the (e.g., HARQ) control feedback may comprise a bitmap, wherein each bit represents a (e.g., HARQ) transmission process.

In a variant compatible with any embodiment or implementation, the transmitter 100 and the receiver 200 use only fallback radio resources for the (e.g., HARQ) the reception 306 and the transmission 406 of the control feedback 608, respectively. Preferably, no control signaling controlling the allocation 906 and/or 914 of the feedback radio resource 708 is provided in the SA 601 (e.g., in the SCI and/or PSCCH). This may happen in case of low priority SL traffic or service data 602 to be transmitted, or in case of a shortage of the radio resource so that the load of control signaling in the SCI and/or PSCCH can be reduced.

In some embodiments, the transmission 406 of the control feedback 608 depends on the congestion or utilization of a channel or the shared spectrum used for the SL radio communication 604. For example, the transmission 406 of the control feedback 608 may only be allowed if a level of congestion is below a predefined or configured threshold value.

Figure 11:
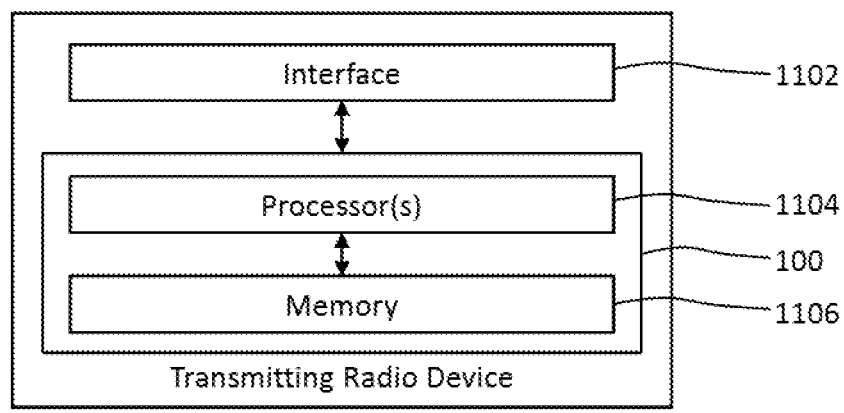
FIG. 11 shows a schematic block diagram of an embodiment of the first radio device of FIG. 1.

FIG. 11 shows a schematic block diagram for an embodiment of the device 100. The device 100 comprises one or more processors 1104 for performing the method 300 and memory 1106 coupled to the processors 1104. For example, the memory 1106 may be encoded with instructions that implement at least one of the modules 102, 104 and 106.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1106, transmitter functionality. For example, the one or more processors 1104 may execute instructions stored in the memory 1106. Such functionality may include providing various features and steps discussed herein, including any of the benefits disclosed to herein. The expression "the device being operative to perform an action" may denote the device 100 being configured to perform the action.

As schematically illustrated in FIG. 11, the device 100 may be embodied by a first radio device 1100, e.g., functioning as a transmitting UE. The first radio device 1100 comprises a radio interface 1102 coupled to the device 100 for radio communication with one or more radio devices and/or one or more other base stations.

Figure 12:
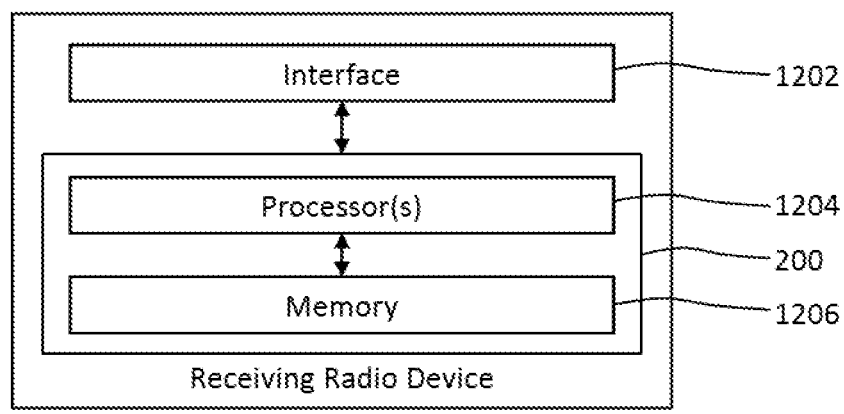
FIG. 12 shows a schematic block diagram of an embodiment of the second radio device of FIG. 2.

FIG. 12 shows a schematic block diagram for an embodiment of the device 200. The device 200 comprises one or more processors 1204 for performing the method 400 and memory 1206 coupled to the processors 1204. For example, the memory 1206 may be encoded with instructions that implement at least one of the modules 202, 204 and 206.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1206, receiver functionality. For example, the one or more processors 1204 may execute instructions stored in the memory 1206. Such functionality may include providing various features and steps discussed herein, including any of the benefits disclosed herein. The expression "the device being operative to perform an action" may denote the device 200 being configured to perform the action.

As schematically illustrated in FIG. 12, the device 200 may be embodied by a second radio device 1200, e.g., functioning as a receiving UE. The second radio device 1200 comprises a radio interface 1202 coupled to the device 200 for radio communication with one or more radio devices and/or one or more other base stations.

Figure 13:
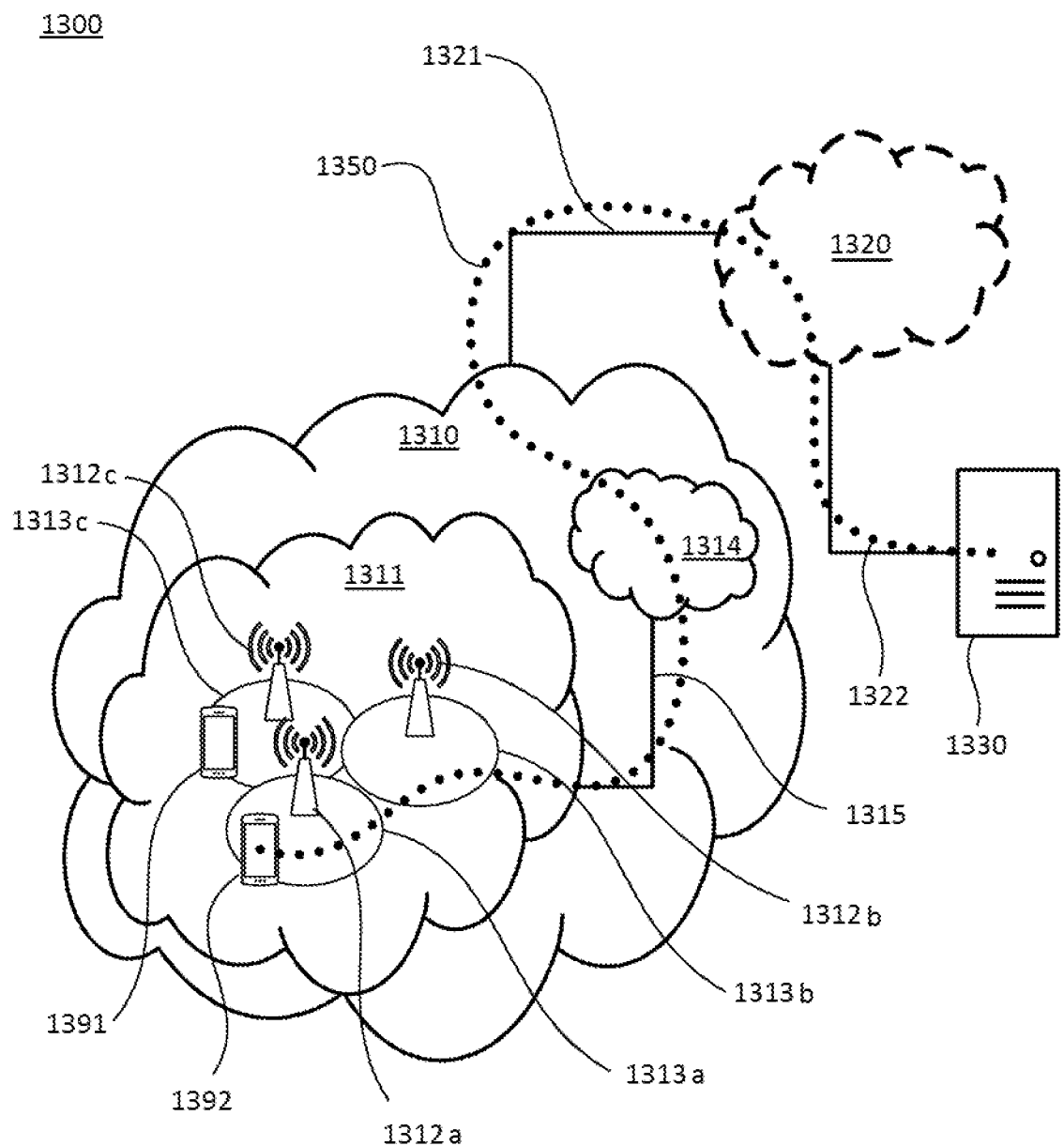
FIG. 13 schematically illustrates a telecommunication network connected via an intermediate network to a host computer.

With reference to FIG. 13, in accordance with an embodiment, a communication system 1300 includes a telecommunication network 1310, such as a 3GPP-type cellular network, which comprises an access network 1311, such as a radio access network, and a core network 1314. The access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to the core network 1314 over a wired or wireless connection 1315. A first user equipment (UE) 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. The connections 1321, 1322 between the telecommunication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may comprise two or more sub-networks (not shown).

The communication system 1300 of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 may not or need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data, which is transmitted using the OTT connection 1450. The user data may depend on the location of the UE 1430 determined in the step 206. The user data may comprise auxiliary information or precision advertisements (also: ads) delivered to the UE 1430. The location may be reported by the UE 1430 to the host computer, e.g., using the OTT connection 1450, and/or by the base station 1420, e.g., using a connection 1460.

The communication system 1400 further includes a base station 1420 provided in a telecommunication system and comprising hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with a UE 1430 located in a coverage area (not shown in FIG. 14) served by the base station 1420. The communication interface 1426 may be configured to facilitate a connection 1460 to the host computer 1410. The connection 1460 may be direct or it may pass through a core network (not shown in FIG. 14) of the telecommunication system and/or through one or more intermediate networks outside the telecommunication system. In the embodiment shown, the hardware 1425 of the base station 1420 further includes processing circuitry 1428, which may comprise one or more programmable processors, application-specific integrated circuits, field programmable gate arrays or to combinations of these (not shown) adapted to execute instructions. The base station 1420 further has software 1421 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

Figure 14:
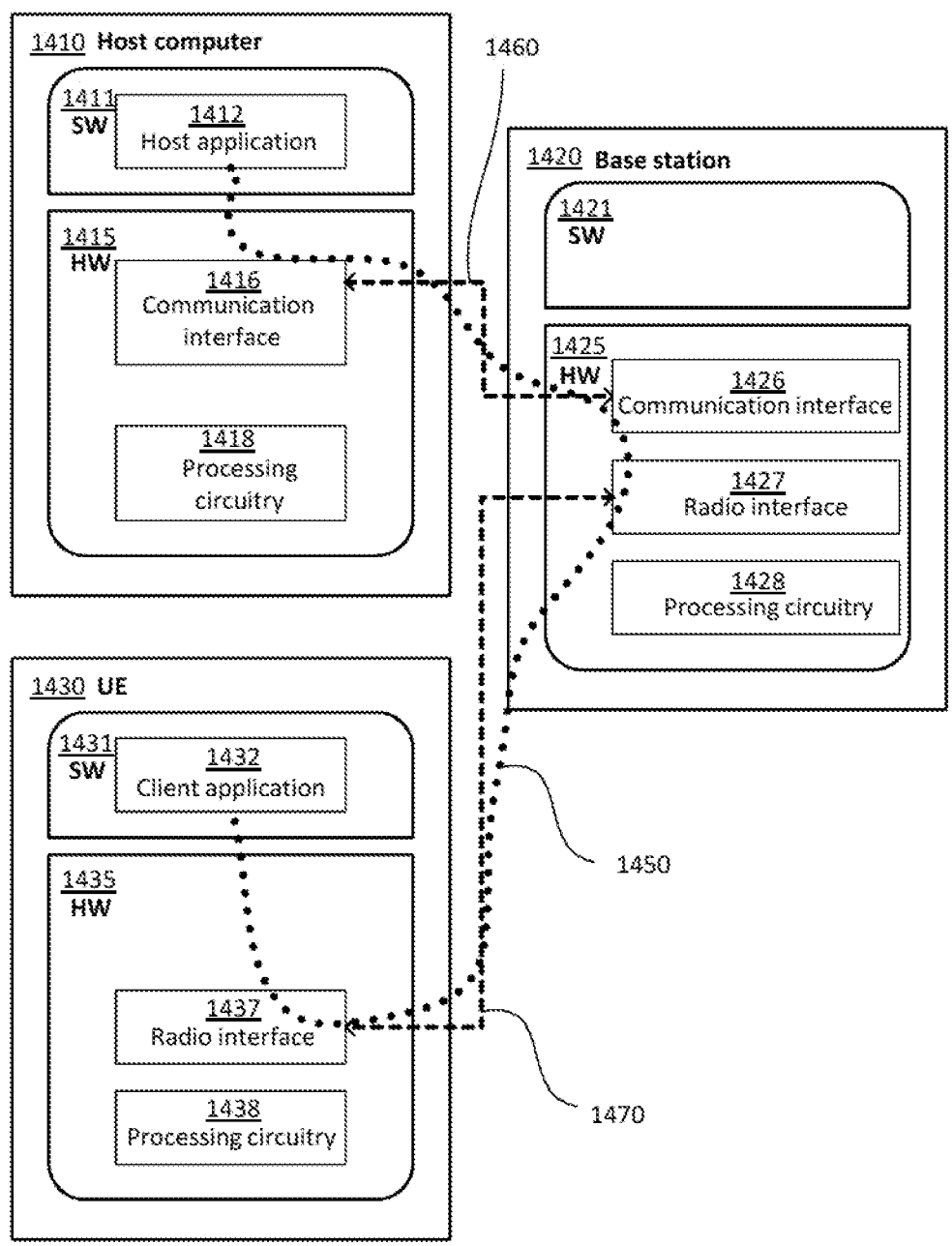
FIG. 14 shows a generalized block diagram of a host computer communicating via a base station or radio device functioning as a gateway with a user equipment over a partially wireless connection.

It is noted that the host computer 1410, base station 1420 and UE 1430 illustrated in FIG. 14 may be identical to the host computer 1130, one of the base stations 1112*a*, 1112*b*, 1112*c* and one of the UEs 1191, 1192 of FIG. 13, respectively. This is to say, the inner workings of these entities may be as shown in FIG. 14 and independently, the surrounding network topology may be that of FIG. 13.

In FIG. 14, the OTT connection 1450 has been drawn abstractly to illustrate the communication between the host computer 1410 and the use equipment 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

The wireless connection 1470 between the UE 1430 and the base station 1420 is in accordance with the teachings of the embodiments described throughout this disclosure. One or more of the various embodiments improve the performance of OTT services provided to the UE 1430 using the OTT connection 1450, in which the wireless connection 1470 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer's 1410 measurements of throughput, propagation times, latency and the like. The measurements may be implemented in that the software 1411, 1431 causes messages to be transmitted, in particular empty or "dummy" messages, using the OTT connection 1450 while it monitors propagation times, errors etc.

Figure 15:
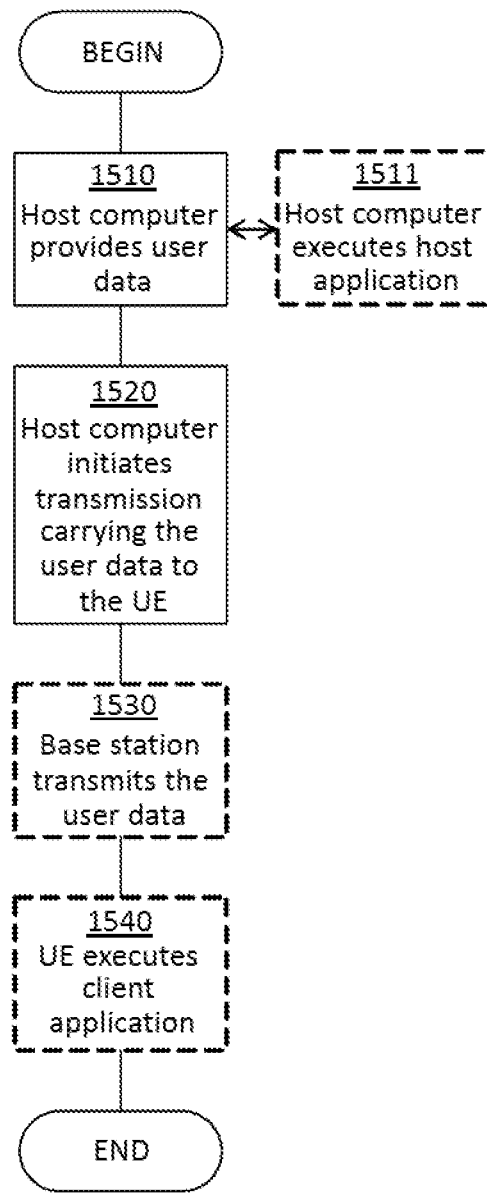
FIGS. 15 and 16 show flowcharts for methods implemented in a communication system including a host computer, a base station or radio device functioning as a gateway and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In a first step 1510 of the method, the host computer provides user data. In an optional substep 1511 of the first step 1510, the host computer provides the user data by executing a host application. In a second step 1520, the host computer initiates a transmission carrying the user data to the UE. In an optional third step 1530, the base station transmits to the UE the user data which was carried in the transmission that the host computer initiated, in accordance with the teachings of the embodiments described throughout this disclosure. In an optional fourth step 1540, the UE executes a client application associated with the host application executed by the host computer.

Figure 16:
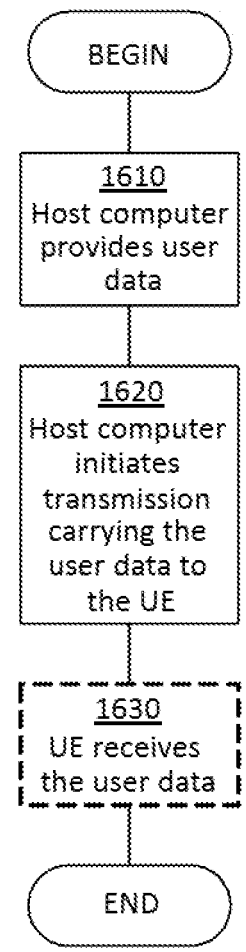

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In a first step 1610 of the method, the host computer provides user data. In an optional substep (not shown) the host computer provides the user data by executing a host application. In a second step 1620, the host computer initiates a transmission carrying the user data to the UE. The transmission may pass via the base station, in accordance with the teachings of the embodiments described throughout this disclosure. In an optional third step 1630, the UE receives the user data carried in the transmission.

The technique may be implemented as a sidelink feedback mechanism. The technique may be implemented as a set of signaling methods and UE behaviors of indicating and/or determining (e.g., selecting) the radio resources for transmitting feedback information in sidelink unicast communications. At the same time, embodiments of the technique may avoid resource collisions when transmitting the feedback information and/or may be configured to improve transmission reliability or packet delivery ratio. Alternatively or in addition, UE behaviors have been described to avoid a collision with other sidelink data transmissions and control signaling transmissions. The embodiments presented here may be combined.

As has become apparent from above description, while existing protocols for resource sensing and resource selection in the LTE sidelink framework (particularly for vehicular radio communication) does not enable a HARQ feedback resource selection, embodiments of the technique may determine and/or forward the feedback radio resource, e.g., for a HARQ feedback.

Same or further embodiments enable a transmission of feedback information as the control feedback over a sidelink for unicast sidelink communication. The control feedback may minimize collisions of radio resources with other data and control signaling transmissions. Thereby and/or by enabling HARQ in unicast sidelink communications, at least some embodiments can improve at least one of a data rate of the data transmission, a packet delivery probability and resource utilization for sidelink communications.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting data using a sidelink, SL, radio communication between a first radio device and a second radio device, the method comprising:
broadcasting a scheduling assignment, SA, announcing a transmission of the data for the second radio device;
transmitting the data according to the SA from the first radio device in a unicast mode to the second radio device; and
receiving, responsive to the data transmission, a control feedback from the second radio device in a unicast mode at the first radio device, wherein the control feedback is received on a feedback radio resource determined by at least one of the first radio device and the second radio device;
wherein at least one of the SA and the control feedback, and the data and the control feedback are transmitted in the same transmission time interval (TTI).

2. The method of claim 1, wherein the feedback radio resource carrying the control feedback is uniquely associated with at least one of the broadcasting of the SA for the data, the transmission of the data, the first radio device and the second radio device.

3. The method of claim 1, wherein the SA is expressly indicative of at least one of time, frequency or space of the feedback radio resource for the reception of the control feedback.

4. The method of claim 3, wherein the feedback radio resource for the reception of the control feedback is defined by a timing relation relative to the broadcasting radio resource for the broadcasting of the SA or relative to the transmission radio resource for the transmission of the data, wherein the timing relation is predefined at the first radio device or configured by a radio network, and/or wherein the SA is indicative of the timing relation.

5. The method of claim 4, the timing relation depends on at least one of a capability of the second radio device, a service type underlying the data and a priority of the data.

6. The method of claim 1, wherein the data is transmitted using a hybrid automatic repeat request, HARQ, process and the control feedback controls the HARQ process, wherein the control feedback is indicative of a redundancy version, RV, to be used in a HARQ retransmission of the data from the first radio device to the second radio device.

7. The method of claim 1, wherein the SL radio communication uses shared radio spectrum, and further comprises determining, on the shared radio spectrum, at least one of a broadcast radio resource for the broadcasting of the SA, a transmission radio resource for the transmitting of the data and the feedback radio resource for the receiving of the control feedback.

8. The method of claim 7, wherein the determination of at least one of the broadcast radio resource, the transmission radio resource and the feedback radio resource is based on monitoring the shared radio spectrum for at least one of energy indicative of another transmission on the shared radio spectrum and a SA from another radio device announcing another transmission on the shared radio spectrum, wherein the transmission radio resource allocated in the transmission time interval, TTI, selectively excludes modulation symbols in the TTI for which the SA from the other radio device is indicative of another control feedback transmission.

9. A method of receiving data using a sidelink, SL, radio communication between a first radio device and a second radio device, the method comprising or initiating the steps of:
receiving a scheduling assignment, SA, announcing a transmission of the data for the second radio device;
receiving the data according to the SA from the first radio device in a unicast mode at the second radio device; and
transmitting, responsive to the data reception, a control feedback from the second radio device in a unicast mode to the first radio device, wherein the control feedback is transmitted on a feedback radio resource determined by at least one of the first radio device and the second radio device;

wherein at least one of the SA and the control feedback, and the data and the control feedback are transmitted in the same transmission time interval (TTI).

10. The method of claim 9, wherein the SL radio communication uses shared radio spectrum and further comprises determining, on the shared radio spectrum, the feedback radio resource for the transmitting of the control feedback, wherein the determination of the feedback radio resource is based on monitoring the shared radio spectrum for at least one of energy indicative of another transmission on the shared radio spectrum, the SA from the first radio device and another SA from another radio device announcing another transmission on the shared radio spectrum.

11. The method of claim 9, wherein the SA is indicative of the determined feedback radio resource.

12. A first radio device for transmitting data using a sidelink, SL, radio communication between the first radio device and a second radio device, the first radio device comprising:
a radio interface configured for sidelink communications;
a processing circuit operatively connected to the radio interface and being configured to:
broadcast a scheduling assignment, SA, announcing a transmission of the data for the second radio device;
transmit the data according to the SA from the first radio device in a unicast mode to the second radio device; and
receive, responsive to the data transmission, a control feedback from the second radio device in a unicast mode at the first radio device, wherein the control feedback is received on a feedback radio resource determined by at least one of the first radio device and the second radio device;
wherein at least one of the SA and the control feedback, and the data and the control feedback are transmitted in the same transmission time interval (TTI).

13. The first radio device of claim 12, wherein the feedback radio resource carrying the control feedback is uniquely associated with at least one of the broadcasting of the SA for the data, the transmission of the data, the first radio device and the second radio device.

14. The first radio device of claim 12, wherein the SL radio communication uses shared radio spectrum, and further comprises determining, on the shared radio spectrum, at least one of a broadcast radio resource for the broadcasting of the SA, a transmission radio resource for the transmitting of the data and the feedback radio resource for the receiving of the control feedback.

15. The first radio device of claim 14, wherein the determination of at least one of the broadcast radio resource, the transmission radio resource and the feedback radio resource is based on monitoring the shared radio spectrum for at least one of energy indicative of another transmission on the shared radio spectrum and a SA from another radio device announcing another transmission on the shared radio spectrum, optionally wherein the transmission radio resource allocated in a transmission time interval, TTI, selectively excludes modulation symbols in the TTI for which the SA from the other radio device is indicative of another control feedback transmission.

16. The first radio device of claim 12, wherein the feedback radio resource for the reception of the control feedback is defined by a timing relation relative to the broadcasting radio resource for the broadcasting of the SA or relative to the transmission radio resource for the transmission of the data, optionally wherein the timing relation is predefined at the first radio device or configured by a radio network, and/or wherein the SA is indicative of the timing relation.

17. The first radio device of claim 16, wherein the timing relation depends on at least one of a capability of the second radio device, a service type underlying the data and a priority of the data.

18. A second radio device for receiving data using a sidelink, SL, radio communication between a first radio device and the second radio device, the second radio device comprising:
a radio interface configured for sidelink communications;
a processing circuit operatively connected to the radio interface and being configured to:
receive a scheduling assignment, SA, announcing a transmission of the data for the second radio device;
a receiving unit configured to receive the data according to the SA from the first radio device in a unicast mode at the second radio device; and
transmit, responsive to the data reception, a control feedback from the second radio device in a unicast mode to the first radio device, wherein the control feedback is transmitted on a feedback radio resource determined by at least one of the first radio device and the second radio device;
wherein at least one of the SA and the control feedback, and the data and the control feedback are transmitted in the same transmission time interval (TTI).

19. The second radio device of claim 18, wherein the SL radio communication uses shared radio spectrum and further comprises determining, on the shared radio spectrum, the feedback radio resource for the transmitting of the control feedback, wherein the determination of the feedback radio resource is based on monitoring the shared radio spectrum for at least one of energy indicative of another transmission on the shared radio spectrum, the SA from the first radio device and another SA from another radio device announcing another transmission on the shared radio spectrum.

20. The second radio device of claim 18, wherein the SA is indicative of the determined feedback radio resource.

* * * * *